US012628208B2

(12) United States Patent
Noh et al.

(10) Patent No.: US 12,628,208 B2
(45) Date of Patent: May 12, 2026

---

(54) METHOD FOR PERFORMING CHANNEL ACCESS FOR TRANSMISSION OF DOWNLINK CHANNEL IN WIRELESS COMMUNICATION SYSTEM, AND DEVICE THEREFOR

(71) Applicant: WILUS INSTITUTE OF STANDARDS AND TECHNOLOGY INC., Gyeonggi-do (KR)

(72) Inventors: Minseok Noh, Seoul (KR); Kyungjun Choi, Gyeonggi-do (KR); Jinsam Kwak, Gyeonggi-do (KR)

(73) Assignee: WILUS INSTITUTE OF STANDARDS AND TECHNOLOGY INC., Gyeonggi-do (KR)

( * ) Notice: Subject to any disclaimer, the term of this patent is extended or adjusted under 35 U.S.C. 154(b) by 464 days.

(21) Appl. No.: 17/793,042

(22) PCT Filed: Jan. 18, 2021

(86) PCT No.: PCT/KR2021/000668
§ 371 (c)(1),
(2) Date: Jul. 15, 2022

(87) PCT Pub. No.: WO2021/145747
PCT Pub. Date: Jul. 22, 2021

(65) Prior Publication Data
US 2023/0054758 A1      Feb. 23, 2023

(30) Foreign Application Priority Data
Jan. 17, 2020    (KR) ........................ 10-2020-0006839

(51) Int. Cl.
*H04W 40/24*        (2009.01)
*H04B 7/15*         (2006.01)
(Continued)

(52) U.S. Cl.
CPC ... *H04W 74/0875* (2013.01); *H04W 72/0446* (2013.01); *H04W 72/12* (2013.01); *H04W 72/23* (2023.01); *H04W 74/006* (2013.01)

(58) Field of Classification Search
CPC . H04W 74/0875; H04W 72/23; H04W 72/12; H04W 74/006; H04W 72/0446;
(Continued)

(56) References Cited

U.S. PATENT DOCUMENTS

2019/0037582 A1     1/2019  Noh et al.
2020/0351847 A1*  11/2020  Kim ...................... H04L 5/0094
(Continued)

FOREIGN PATENT DOCUMENTS

EP          3 276 867        4/2020
WO         2017/140252       8/2017

OTHER PUBLICATIONS

International Search Report for PCT/KR2021/000668 mailed on Apr. 15, 2021 and its English translation from WIPO.
(Continued)

*Primary Examiner* — Derrick V Rose
(74) *Attorney, Agent, or Firm* — WOMBLE BOND DICKINSON (US) LLP

(57) ABSTRACT

A method by which a base station transmits a downlink channel in a wireless communication system comprises the steps of: selecting a channel access priority class (CAPC) from among a plurality of CAPCs preset for the transmission of a downlink channel; performing channel access on a first channel on the basis of a parameter set in response to the CAPC; and transmitting, to a terminal, one or more physical downlink control channels (PDCCHs) on the first channel.

8 Claims, 11 Drawing Sheets

(51) Int. Cl.

| | | |
|---|---|---|
| *H04W 72/0446* | (2023.01) | |
| *H04W 72/12* | (2023.01) | |
| *H04W 72/23* | (2023.01) | |
| *H04W 74/00* | (2009.01) | |
| *H04W 74/08* | (2009.01) | |

(58) Field of Classification Search
CPC ........... H04W 72/1263; H04W 72/232; H04W
74/0808
See application file for complete search history.

(56) References Cited

U.S. PATENT DOCUMENTS

| | | | | |
|---|---|---|---|---|
| 2021/0051718 A1* | 2/2021 | Bhattad | ................. | H04W 72/23 |
| 2022/0132563 A1* | 4/2022 | Kim | ...................... | H04W 74/08 |
| 2022/0264648 A1* | 8/2022 | Wu | ................... | H04W 72/1263 |

OTHER PUBLICATIONS

Written Opinion of the International Searching Authority for PCT/
KR2021/000668 mailed on Apr. 15, 2021 and its English translation
by Google Translate.
QualcommIncorporated: "Channel access procedures for NR unli-
censed" 3GPP TSG RAN WG1 Meeting #98bis, R1-1911097,
Chongqing, CN, Oct. 14-20, 2019.
Intel Corporation: "Channel access mechanism for NR-unlicensed",
3GPP TSG RAN WG1 Meeting #99, R1-1912197, Reno, USA,
Nov. 18-22, 2019.
Ericsson: "Channel access procedures", 3GPP TSG-RAN WG1
Meeting #99, R1-1912709, Reno, USA, Nov. 18-22, 2019.

* cited by examiner

DRAWING LEGEND INSERTION

1 radio frame, $T_f = \left(\Delta f_{max} N_f / 100\right) \cdot T_c = 10\,\text{ms}$ 1 sub-frame, $T_{sf} = \left(\Delta f_{max} N_f / 1000\right) \cdot T_c = 1\,\text{ms}$

| #0 | #1 | #2 | #3 | ... | #8 | #9 |

| slot#0 | slot#1 | slot#2 | slot#3 | ... | #slot#$(2^\mu - 2)$ | slot#$(2^\mu - 1)$ |

1 slot, $T_{slot} = \left(\Delta f_{max} N_f / 1000\right) \cdot T_c \cdot 2^{-\mu} = 2^{-\mu}\,\text{ms}$ (a) Single CC (b) Multiple CC selecting a channel access priority class (CAPC) from among multiple CAPCs preconfigured for transmission of a downlink channel — S1210 performing channel access on a first channel on the basis of a parameter configured to correspond to the CAPC — S1220 transmitting, to a terminal, one or more physical downlink control channels (PDCCHs) on the first channel — S1230

METHOD FOR PERFORMING CHANNEL ACCESS FOR TRANSMISSION OF DOWNLINK CHANNEL IN WIRELESS COMMUNICATION SYSTEM, AND DEVICE THEREFOR

CROSS-REFERENCE TO RELATED APPLICATIONS

This application is the National Stage filing under 35 U.S.C. 371 of International Application No. PCT/KR2021/000668, filed on Jan. 18, 2021, which claims the benefit of KR Provisional Application No. 10-2020-0006839, filed on Jan. 17, 2020, the contents of which are all hereby incorporated by reference herein in their entirety.

TECHNICAL FIELD

The present specification relates to a wireless communication system and, more specifically, to a method for performing channel access for transmission of a downlink channel, and a device therefor.

BACKGROUND ART

After commercialization of 4th generation (4G) communication system, in order to meet the increasing demand for wireless data traffic, efforts are being made to develop new 5th generation (5G) communication systems. The 5G communication system is called as a beyond 4G network communication system, a post LTE system, or a new radio (NR) system. In order to achieve a high data transfer rate, 5G communication systems include systems operated using the millimeter wave (mmWave) band of 6 GHz or more, and include a communication system operated using a frequency band of 6 GHz or less in terms of ensuring coverage so that implementations in base stations and terminals are under consideration.

A 3rd generation partnership project (3GPP) NR system enhances spectral efficiency of a network and enables a communication provider to provide more data and voice services over a given bandwidth. Accordingly, the 3GPP NR system is designed to meet the demands for high-speed data and media transmission in addition to supports for large volumes of voice. The advantages of the NR system are to have a higher throughput and a lower latency in an identical platform, support for frequency division duplex (FDD) and time division duplex (TDD), and a low operation cost with an enhanced end-user environment and a simple architecture.

For more efficient data processing, dynamic TDD of the NR system may use a method for varying the number of orthogonal frequency division multiplexing (OFDM) symbols that may be used in an uplink and downlink according to data traffic directions of cell users. For example, when the downlink traffic of the cell is larger than the uplink traffic, the base station may allocate a plurality of downlink OFDM symbols to a slot (or subframe). Information about the slot configuration should be transmitted to the terminals.

In order to alleviate the path loss of radio waves and increase the transmission distance of radio waves in the mmWave band, in 5G communication systems, beamforming, massive multiple input/output (massive MIMO), full dimensional MIMO (FD-MIMO), array antenna, analog beamforming, hybrid beamforming that combines analog beamforming and digital beamforming, and large scale antenna technologies are discussed. In addition, for network improvement of the system, in the 5G communication system, technology developments related to evolved small cells, advanced small cells, cloud radio access network (cloud RAN), ultra-dense network, device to device communication (D2D), vehicle to everything communication (V2X), wireless backhaul, non-terrestrial network communication (NTN), moving network, cooperative communication, coordinated multi-points (CoMP), interference cancellation, and the like are being made. In addition, in the 5G system, hybrid FSK and QAM modulation (FQAM) and sliding window superposition coding (SWSC), which are advanced coding modulation (ACM) schemes, and filter bank multi-carrier (FBMC), non-orthogonal multiple access (NOMA), and sparse code multiple access (SCMA), which are advanced connectivity technologies, are being developed.

Meanwhile, in a human-centric connection network where humans generate and consume information, the Internet has evolved into the Internet of Things (IoT) network, which exchanges information among distributed components such as objects. Internet of Everything (IoE) technology, which combines IoT technology with big data processing technology through connection with cloud servers, is also emerging. In order to implement IoT, technology elements such as sensing technology, wired/wireless communication and network infrastructure, service interface technology, and security technology are required, so that in recent years, technologies such as sensor network, machine to machine (M2M), and machine type communication (MTC) have been studied for connection between objects. In the IoT environment, an intelligent internet technology (IT) service that collects and analyzes data generated from connected objects to create new value in human life can be provided. Through the fusion and mixture of existing information technology (IT) and various industries, IoT can be applied to fields such as smart home, smart building, smart city, smart car or connected car, smart grid, healthcare, smart home appliance, and advanced medical service.

Accordingly, various attempts have been made to apply the 5G communication system to the IoT network. For example, technologies such as a sensor network, a machine to machine (M2M), and a machine type communication (MTC) are implemented by techniques such as beamforming, MIMO, and array antennas. The application of the cloud RAN as the big data processing technology described above is an example of the fusion of 5G technology and IoT technology. Generally, a mobile communication system has been developed to provide voice service while ensuring the user's activity.

However, the mobile communication system is gradually expanding not only the voice but also the data service, and now it has developed to the extent of providing high-speed data service. However, in a mobile communication system in which services are currently being provided, a more advanced mobile communication system is required due to a shortage phenomenon of resources and a high-speed service demand of users.

In recent years, with the explosion of mobile traffic due to the spread of smart devices, it is becoming difficult to cope with the increasing data usage for providing cellular communication services using only the existing licensed frequency spectrums or licensed frequency bands.

In such a situation, a method of using an unlicensed frequency spectrum or an unlicensed frequency band (e.g., 2.4 GHz band, 5 GHz band etc) for providing cellular communication services is being discussed as a solution to the problem of lack of spectrum.

Unlike in licensed bands in which telecommunications carriers secure exclusive use rights through procedures such as auctions, in unlicensed bands, multiple communication devices may be used simultaneously without restrictions on the condition that only a certain level of adjacent band protection regulations are observed. For this reason, when an unlicensed band is used for cellular communication service, it is difficult to guarantee the communication quality to the level provided in the licensed band, and it is likely that interference with existing wireless communication devices (e.g., wireless LAN devices) using the unlicensed band occurs.

In order to use LTE and NR technologies in unlicensed bands, research on coexistence with existing devices for unlicensed bands and efficient sharing of wireless channels with other wireless communication devices is to be conducted in advance. That is, it is required to develop a robust coexistence mechanism (RCM) such that devices using LTE and NR technologies in the unlicensed band do not affect the existing devices for unlicensed bands.

DISCLOSURE OF INVENTION

Technical Problem

The present specification is to provide a method for performing channel access for transmission of a downlink channel in a wireless communication system.

The present specification is to provide a method for selecting a channel access priority class (CAPC) during channel access for downlink channel transmission, and device therefore.

Solution to Problem

The present specification provides a method for transmitting a downlink channel in a wireless communication system.

Specifically, the method performed by a base station includes: selecting a channel access priority class (CAPC) from among multiple CAPCs preconfigured for transmission of a downlink channel; performing channel access on a first channel on the basis of a parameter configured to correspond to the CAPC; and transmitting, to a terminal, one or more physical downlink control channels (PDCCHs) on the first channel, wherein the CAPC is selected on the basis information included in the one or more PDCCHs.

In the present specification, a base station configured to perform a method for transmitting a downlink channel in a wireless communication system includes a communication module, and a processor configured to control the communication module, wherein the processor selects a channel access priority class (CAPC) from among CAPCs preconfigured for transmission of a downlink channel, performs channel access on a first channel on the basis of a parameter configured to correspond to the CAPC, transmits, to a terminal, one or more physical downlink control channels (PDCCHs) on the first channel, wherein the CAPC is selected on the basis of information included in the one or more PDCCHs.

In the present specification, a method for receiving a downlink channel by a terminal in a wireless communication includes: performing monitoring for reception of one or more physical downlink control channels (PDCCHs) in a control resource set (CORESET); and receiving, from a base station, the one or more PDCCHs in the CORESET, wherein the one or more PDCCHs are transmitted on a first channel on which the base station has performed channel access, the channel access is performed on the basis of a parameter configured to correspond to a channel access priority class (CAPC) selected from among preconfigured multiple CAPCs, and the CAPC is selected on the basis of information included in the one or more PDCCHs.

In addition, in the present invention, for the information included in the one or more PDCCHs, information for scheduling a physical downlink shared channel (PDSCH) transmitted on the same slot as a slot on which the one or more PDCCHs are transmitted and information for scheduling a physical uplink shared channel (PUSCH) are excluded.

In addition, in the present specification, the information included in the one or more PDCCHs includes at least one of: i) information on a slot format, an available resource block (RB) set, a channel occupancy time (COT), and search space set group switching; ii) information on an OFDM symbol and a physical resource block (PRB) causing the terminal to assume that there is no intended transmission; iii) information on a transmit power control (TPC) command for an uplink channel; and iv) information on a TPC command for a sounding reference signal (SRS).

In addition, in the present specification, the information included in the one or more PDCCHs corresponds to information for scheduling a PDSCH transmitted on a slot different from a slot on which the one or more PDCCHs are transmitted.

In addition, in the present specification, the information included in the one or more PDCCHs corresponds to information for scheduling a PUSCH.

In addition, in the present specification, the CAPC corresponds to a CAPC having the highest priority, among the preconfigured multiple CAPCs.

In addition, in the present specification, the CAPC may be a CAPC having the lowest priority, among the preconfigured multiple CAPCs.

In addition, in the present specification, the PUSCH includes unicast data, and the CAPC is selected on the basis of a traffic type of the unicast data.

In addition, in the present specification, the one or more PDCCHs are transmitted on a control resource set (CORESET), and when multiple PDCCHs are transmitted on the CORESET, the CAPC corresponds to a CAPC having the lowest priority, among the CAPCs configured for each of the multiple PDCCHs.

Advantageous Effects of Invention

The present specification provides a method for determining a channel access priority class for downlink channel transmission during channel access in a wireless communication system, and a device therefor, thereby having an advantageous effect of achieving efficient channel transmission.

BEST MODE FOR CARRYING OUT THE INVENTION

Figure 1:
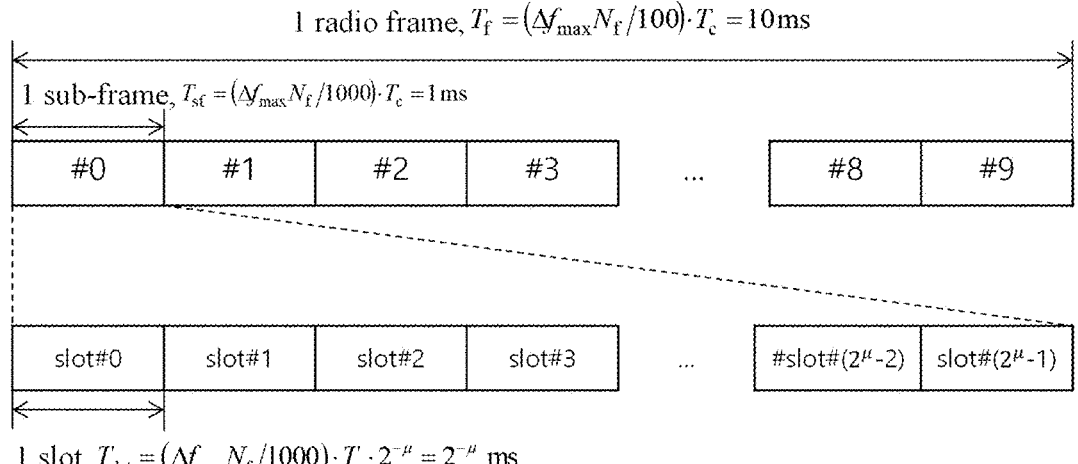
FIG. 1 illustrates an example of a wireless frame structure used in a wireless communication system.

Terms used in the specification adopt general terms which are currently widely used as possible by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it intends to be revealed that a term used in the specification should be analyzed based on not just a name of the term but a substantial meaning of the term and contents throughout the specification.

Throughout this specification and the claims that follow, when it is described that an element is "connected" to another element, the element may be "directly connected" to the other element or "electrically connected" to the other element through a third element. Further, unless explicitly described to the contrary, the word "comprise" will be understood to imply the inclusion of stated elements but not the exclusion of any other elements unless otherwise stated. Moreover, limitations such as "more than or equal to" or "less than or equal to" based on a specific threshold may be appropriately substituted with "more than" or "less than", respectively, in some exemplary embodiments.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), and the like. The CDMA may be implemented by a wireless technology such as universal terrestrial radio access (UTRA) or CDMA2000. The TDMA may be implemented by a wireless technology such as global system for mobile communications (GSM)/general packet radio service (GPRS)/enhanced data rates for GSM evolution (EDGE). The OFDMA may be implemented by a wireless technology such as IEEE 802.11(Wi-Fi), IEEE 802.16(WiMAX), IEEE 802-20, evolved UTRA (E-UTRA), and the like. The UTRA is a part of a universal mobile telecommunication system (UMTS). 3rd generation partnership project (3GPP) long term evolution (LTE) is a part of an evolved UMTS (E-UMTS) using evolved-UMTS terrestrial radio access (E-UTRA) and LTE-advanced (A) is an evolved version of the 3GPP LTE. 3GPP new radio (NR) is a system designed separately from LTE/LTE-A, and is a system for supporting enhanced mobile broadband (eMBB), ultra-reliable and low latency communication (URLLC), and massive machine type communication (mMTC) services, which are requirements of IMT-2020. For the clear description, 3GPP NR is mainly described, but the technical idea of the present invention is not limited thereto.

Unless otherwise specified herein, the base station may include a next generation node B (gNB) defined in 3GPP NR. Furthermore, unless otherwise specified, a terminal may include a user equipment (UE). Hereinafter, in order to help the understanding of the description, each content is described separately by the embodiments, but each embodiment may be used in combination with each other. In the present specification, the configuration of the UE may indicate a configuration by the base station. In more detail, the base station may configure a value of a parameter used in an operation of the UE or a wireless communication system by transmitting a channel or a signal to the UE.

FIG. 1 illustrates an example of a wireless frame structure used in a wireless communication system.

Referring to FIG. 1, the wireless frame (or radio frame) used in the 3GPP NR system may have a length of 10 ms ($\Delta f_{max}N_f/100)^*T_c$). In addition, the wireless frame includes 10 subframes (SFs) having equal sizes. Herein, $\Delta f_{max}=480^*10^3$ Hz, $N_f=4096$, $T_c=1/(\Delta f_{ref}^*N_{f,ref})$, $\Delta f_{ref}=15^*10^3$ Hz, and $N_{f,ref}=2048$. Numbers from 0 to 9 may be respectively allocated to 10 subframes within one wireless frame. Each subframe has a length of 1 ms and may include one or more slots according to a subcarrier spacing. More specifically, in the 3GPP NR system, the subcarrier spacing that may be used is $15^*2^\mu$ kHz, and $\mu$ can have a value of $\mu=0, 1, 2, 3, 4$ as subcarrier spacing configuration. That is, 15 kHz, 30 kHz, 60 kHz, 120 kHz and 240 kHz may be used for subcarrier spacing. One subframe having a length of 1 ms may include $2^\mu$ slots. In this case, the length of each slot is $2^\mu$ ms. Numbers from 0 to $2^\mu-1$ may be respectively allocated to $2^\mu$ slots within one wireless frame. In addition, numbers from 0 to $10^*2^\mu-1$ may be respectively allocated to slots within one subframe. The time resource may be distinguished by at least one of a wireless frame number (also referred to as a wireless frame index), a subframe number (also referred to as a subframe index), and a slot number (or a slot index).

Figure 2:
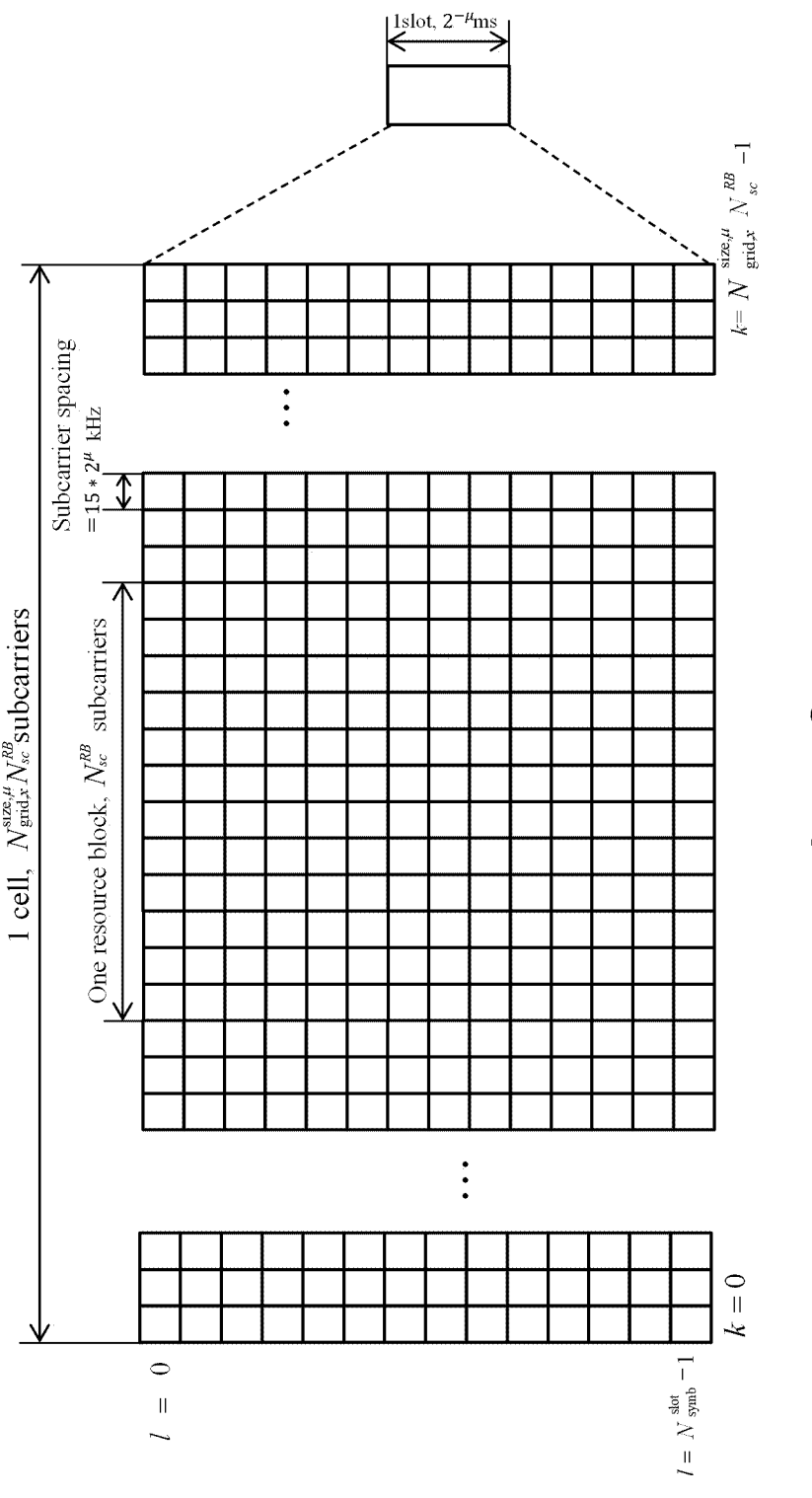
FIG. 2 illustrates an example of a downlink (DL)/uplink (UL) slot structure in a wireless communication system.

FIG. 2 illustrates an example of a downlink (DL)/uplink (UL) slot structure in a wireless communication system. In particular, FIG. 2 shows the structure of the resource grid of the 3GPP NR system.

There is one resource grid per antenna port. Referring to FIG. 2, a slot includes a plurality of orthogonal frequency division multiplexing (OFDM) symbols in a time domain and includes a plurality of resource blocks (RBs) in a frequency domain. An OFDM symbol also means one symbol section. Unless otherwise specified, OFDM symbols may be referred to simply as symbols. One RB includes 12 consecutive subcarriers in the frequency domain. Referring to FIG. 2, a signal transmitted from each slot may be represented by a resource grid including $N^{size,\mu}_{grid,x} \times N^{RB}_{sc}$ subcarriers, and $N^{slot}_{symb}$ OFDM symbols. Here, x=DL when the signal is a DL signal, and x=UL when the signal is an UL signal. $N^{size,\mu}_{grid,x}$ represents the number of resource blocks (RBs) according to the subcarrier spacing constituent $\mu$ (x is DL or UL), and $N^{slot}_{symb}$ represents the number of OFDM symbols in a slot. $N^{RB}_{sc}$ is the number of subcarriers constituting one RB and $N^{RB}_{sc}=12$. An OFDM symbol may be referred to as a cyclic shift OFDM (CP- OFDM) symbol or a discrete Fourier transform spread OFDM (DFT-s-OFDM) symbol according to a multiple access scheme.

The number of OFDM symbols included in one slot may vary according to the length of a cyclic prefix (CP). For example, in the case of a normal CP, one slot includes 14 OFDM symbols, but in the case of an extended CP, one slot may include 12 OFDM symbols. In a specific embodiment, the extended CP can only be used at 60 kHz subcarrier spacing. In FIG. 2, for convenience of description, one slot is configured with 14 OFDM symbols by way of example, but embodiments of the present disclosure may be applied in a similar manner to a slot having a different number of OFDM symbols. Referring to FIG. 2, each OFDM symbol includes $N^{size,\mu}_{grid,x}*N^{RB}_{sc}$ subcarriers in the frequency domain. The type of subcarrier may be divided into a data subcarrier for data transmission, a reference signal subcarrier for transmission of a reference signal, and a guard band. The carrier frequency is also referred to as the center frequency (fc).

One RB may be defined by $N^{RB}_{sc}$ (e. g., 12) consecutive subcarriers in the frequency domain. For reference, a resource configured with one OFDM symbol and one subcarrier may be referred to as a resource element (RE) or a tone. Therefore, one RB can be configured with $N^{slot}_{symb}*N^{RB}_{sc}$ resource elements. Each resource element in the resource grid can be uniquely defined by a pair of indexes (k, l) in one slot. k may be an index assigned from 0 to $N^{size,\mu}_{grid,x}*N^{RB}_{sc}-1$ in the frequency domain, and l may be an index assigned from 0 to $N^{slot}_{symb}-1$ in the time domain.

In order for the UE to receive a signal from the base station or to transmit a signal to the base station, the time/frequency of the UE may be synchronized with the time/frequency of the base station. This is because when the base station and the UE are synchronized, the UE can determine the time and frequency parameters necessary for demodulating the DL signal and transmitting the UL signal at the correct time.

Each symbol of a radio frame used in a time division duplex (TDD) or an unpaired spectrum may be configured with at least one of a DL symbol, an UL symbol, and a flexible symbol. A radio frame used as a DL carrier in a frequency division duplex (FDD) or a paired spectrum may be configured with a DL symbol or a flexible symbol, and a radio frame used as a UL carrier may be configured with a UL symbol or a flexible symbol. In the DL symbol, DL transmission is possible, but UL transmission is impossible. In the UL symbol, UL transmission is possible, but DL transmission is impossible. The flexible symbol may be determined to be used as a DL or an UL according to a signal.

Information on the type of each symbol, i.e., information representing any one of DL symbols, UL symbols, and flexible symbols, may be configured with a cell-specific or common radio resource control (RRC) signal. In addition, information on the type of each symbol may additionally be configured with a UE-specific or dedicated RRC signal. The base station informs, by using cell-specific RRC signals, i) the period of cell-specific slot configuration, ii) the number of slots with only DL symbols from the beginning of the period of cell-specific slot configuration, iii) the number of DL symbols from the first symbol of the slot immediately following the slot with only DL symbols, iv) the number of slots with only UL symbols from the end of the period of cell specific slot configuration, and v) the number of UL symbols from the last symbol of the slot immediately before the slot with only the UL symbol. Here, symbols not configured with any one of a UL symbol and a DL symbol are flexible symbols.

When the information on the symbol type is configured with the UE-specific RRC signal, the base station may signal whether the flexible symbol is a DL symbol or an UL symbol in the cell-specific RRC signal. In this case, the UE-specific RRC signal can not change a DL symbol or a UL symbol configured with the cell-specific RRC signal into another symbol type. The UE-specific RRC signal may signal the number of DL symbols among the $N^{slot}_{symb}$ symbols of the corresponding slot for each slot, and the number of UL symbols among the $N^{slot}_{symb}$ symbols of the corresponding slot. In this case, the DL symbol of the slot may be continuously configured with the first symbol to the i-th symbol of the slot. In addition, the UL symbol of the slot may be continuously configured with the j-th symbol to the last symbol of the slot (where i<j). In the slot, symbols not configured with any one of a UL symbol and a DL symbol are flexible symbols.

The type of symbol configured with the above RRC signal may be referred to as a semi-static DL/UL configuration. In the semi-static DL/UL configuration previously configured with RRC signals, the flexible symbol may be indicated as a DL symbol, an UL symbol, or a flexible symbol through dynamic slot format information (SFI) transmitted on a physical DL control channel (PDCCH). In this case, the DL symbol or UL symbol configured with the RRC signal is not changed to another symbol type. Table 1 exemplifies the dynamic SFI that the base station can indicate to the UE.

TABLE 1

| | Symbol number in a slot | | | | | | | | | | | | | | | Symbol number in a slot | | | | | | | | | | | | | |
|---|---|---|---|---|---|---|---|---|---|---|---|---|---|---|---|---|---|---|---|---|---|---|---|---|---|---|---|---|---|
| index | 0 | 1 | 2 | 3 | 4 | 5 | 6 | 7 | 8 | 9 | 10 | 11 | 12 | 13 | index | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D | 28 | D | D | D | D | D | D | D | D | D | D | D | D | X | U |
| 1 | U | U | U | U | U | U | U | U | U | U | U | U | U | U | 29 | D | D | D | D | D | D | D | D | D | D | D | X | X | U |
| 2 | X | X | X | X | X | X | X | X | X | X | X | X | X | X | 30 | D | D | D | D | D | D | D | D | D | D | X | X | X | U |
| 3 | D | D | D | D | D | D | D | D | D | D | D | D | D | X | 31 | D | D | D | D | D | D | D | D | D | D | D | X | U | U |
| 4 | D | D | D | D | D | D | D | D | D | D | D | D | X | X | 32 | D | D | D | D | D | D | D | D | D | D | X | X | U | U |
| 5 | D | D | D | D | D | D | D | D | D | D | D | X | X | X | 33 | D | D | D | D | D | D | D | D | D | X | X | X | U | U |
| 6 | D | D | D | D | D | D | D | D | D | D | X | X | X | X | 34 | D | X | U | U | U | U | U | U | U | U | U | U | U | U |
| 7 | D | D | D | D | D | D | D | D | D | X | X | X | X | X | 35 | D | D | X | U | U | U | U | U | U | U | U | U | U | U |
| 8 | X | X | X | X | X | X | X | X | X | X | X | X | X | U | 36 | D | D | D | X | U | U | U | U | U | U | U | U | U | U |
| 9 | X | X | X | X | X | X | X | X | X | X | X | X | U | U | 37 | D | X | X | U | U | U | U | U | U | U | U | U | U | U |
| 10 | X | U | U | U | U | U | U | U | U | U | U | U | U | U | 38 | D | D | X | X | U | U | U | U | U | U | U | U | U | U |
| 11 | X | X | U | U | U | U | U | U | U | U | U | U | U | U | 39 | D | D | D | X | X | U | U | U | U | U | U | U | U | U |
| 12 | X | X | X | U | U | U | U | U | U | U | U | U | U | U | 40 | D | X | X | X | U | U | U | U | U | U | U | U | U | U |
| 13 | X | X | X | X | U | U | U | U | U | U | U | U | U | U | 41 | D | D | X | X | X | U | U | U | U | U | U | U | U | U |

TABLE 1-continued

| | Symbol number in a slot | | | | | | | | | | | | | | | Symbol number in a slot | | | | | | | | | | | | | |
|---|---|---|---|---|---|---|---|---|---|---|---|---|---|---|---|---|---|---|---|---|---|---|---|---|---|---|---|---|---|
| index | 0 | 1 | 2 | 3 | 4 | 5 | 6 | 7 | 8 | 9 | 10 | 11 | 12 | 13 | index | 0 | 1 | 2 | 3 | 4 | 5 | 6 | 7 | 8 | 9 | 10 | 11 | 12 | 13 |
| 14 | X | X | X | X | X | U | U | U | U | U | U | U | U | U | 42 | D | D | D | X | X | X | U | U | U | U | U | U | U | U |
| 15 | X | X | X | X | X | X | U | U | U | U | U | U | U | U | 43 | D | D | D | D | D | D | D | D | D | X | X | X | X | U |
| 16 | D | X | X | X | X | X | X | X | X | X | X | X | X | X | 44 | D | D | D | D | D | D | X | X | X | X | X | X | U | U |
| 17 | D | D | X | X | X | X | X | X | X | X | X | X | X | X | 45 | D | D | D | D | D | D | X | X | U | U | U | U | U | U |
| 18 | D | D | D | X | X | X | X | X | X | X | X | X | X | X | 46 | D | D | D | D | D | X | U | D | D | D | D | D | X | U |
| 19 | D | X | X | X | X | X | X | X | X | X | X | X | X | U | 47 | D | D | X | U | U | U | U | D | D | X | U | U | U | U |
| 20 | D | D | X | X | X | X | X | X | X | X | X | X | X | U | 48 | D | X | U | U | U | U | U | D | X | U | U | U | U | U |
| 21 | D | D | D | X | X | X | X | X | X | X | X | X | X | U | 49 | D | D | D | D | X | X | U | D | D | D | D | X | X | U |
| 22 | D | X | X | X | X | X | X | X | X | X | X | X | U | U | 50 | D | D | X | X | U | U | U | D | D | X | X | U | U | U |
| 23 | D | D | X | X | X | X | X | X | X | X | X | X | U | U | 51 | D | X | X | U | U | U | U | D | X | X | U | U | U | U |
| 24 | D | D | D | X | X | X | X | X | X | X | X | X | U | U | 52 | D | X | X | X | X | X | U | D | X | X | X | X | X | U |
| 25 | D | X | X | X | X | X | X | X | X | X | X | U | U | U | 53 | D | X | X | X | X | X | U | D | D | X | X | X | X | U |
| 26 | D | D | X | X | X | X | X | X | X | X | X | U | U | U | 54 | X | X | X | X | X | X | X | D | D | D | D | D | D | D |
| 27 | D | D | D | X | X | X | X | X | X | X | X | U | U | U | 55 | D | D | X | X | X | U | U | U | D | D | D | D | D | D |
| 56~255 | | | | | | | | | | | | | | | Reserved | | | | | | | | | | | | | | |

In Table 1, D denotes a DL symbol, U denotes a UL symbol, and X denotes a flexible symbol. As shown in Table 1, up to two DL/UL switching in one slot may be allowed.

Figure 3:
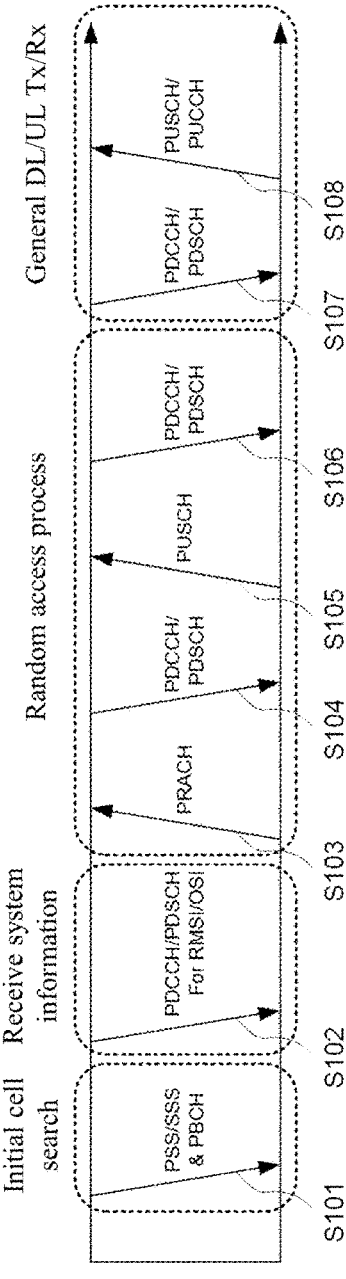
FIG. 3 is a diagram for explaining a physical channel used in a 3GPP system and a typical signal transmission method using the physical channel.

FIG. 3 is a diagram for explaining a physical channel used in a 3GPP system (e.g., NR) and a typical signal transmission method using the physical channel.

If the power of the UE is turned on or the UE camps on a new cell, the UE performs an initial cell search (S101). Specifically, the UE may synchronize with the BS in the initial cell search. For this, the UE may receive a primary synchronization signal (PSS) and a secondary synchronization signal (SSS) from the base station to synchronize with the base station, and obtain information such as a cell ID. Thereafter, the UE can receive the physical broadcast channel from the base station and obtain the broadcast information in the cell.

Upon completion of the initial cell search, the UE receives a physical downlink shared channel (PDSCH) according to the physical downlink control channel (PDCCH) and information in the PDCCH, so that the UE can obtain more specific system information than the system information obtained through the initial cell search (S102). Herein, the system information received by the UE is cell-common system information for normal operating of the UE in a physical layer in radio resource control (RRC) and is referred to remaining system information, or system information block (SIB) 1 is called.

When the UE initially accesses the base station or does not have radio resources for signal transmission (i.e. the UE at RRC_IDLE mode), the UE may perform a random access procedure on the base station (operations S103 to S106). First, the UE can transmit a preamble through a physical random access channel (PRACH) (S103) and receive a response message for the preamble from the base station through the PDCCH and the corresponding PDSCH (S104). When a valid random access response message is received by the UE, the UE transmits data including the identifier of the UE and the like to the base station through a physical uplink shared channel (PUSCH) indicated by the UL grant transmitted through the PDCCH from the base station (S105). Next, the UE waits for reception of the PDCCH as an indication of the base station for collision resolution. If the UE successfully receives the PDCCH through the identifier of the UE (S106), the random access process is terminated. The UE may obtain UE-specific system information for normal operating of the UE in the physical layer in RRC layer during a random access process. When the UE obtain the UE-specific system information, the UE enter RRC connecting mode (RRC_CONNECTED mode).

The RRC layer is used for generating or managing message for controlling connection between the UE and radio access network (RAN). In more detail, the base station and the UE, in the RRC layer, may perform broadcasting cell system information required by every UE in the cell, managing mobility and handover, measurement report of the UE, storage management including UE capability management and device management. In general, the RRC signal is not changed and maintained quite long interval since a period of an update of a signal delivered in the RRC layer is longer than a transmission time interval (TTI) in physical layer.

After the above-described procedure, the UE receives PDCCH/PDSCH (S107) and transmits a physical uplink shared channel (PUSCH)/physical uplink control channel (PUCCH) (S108) as a general UL/DL signal transmission procedure. In particular, the UE may receive downlink control information (DCI) through the PDCCH. The DCI may include control information such as resource allocation information for the UE. Also, the format of the DCI may vary depending on the intended use. The uplink control information (UCI) that the UE transmits to the base station through UL includes a DL/UL ACK/NACK signal, a channel quality indicator (CQI), a precoding matrix index (PMI), a rank indicator (RI), and the like. Here, the CQI, PMI, and RI may be included in channel state information (CSI). In the 3GPP NR system, the UE may transmit control information such as HARQ-ACK and CSI described above through the PUSCH and/or PUCCH.

Figure 4:
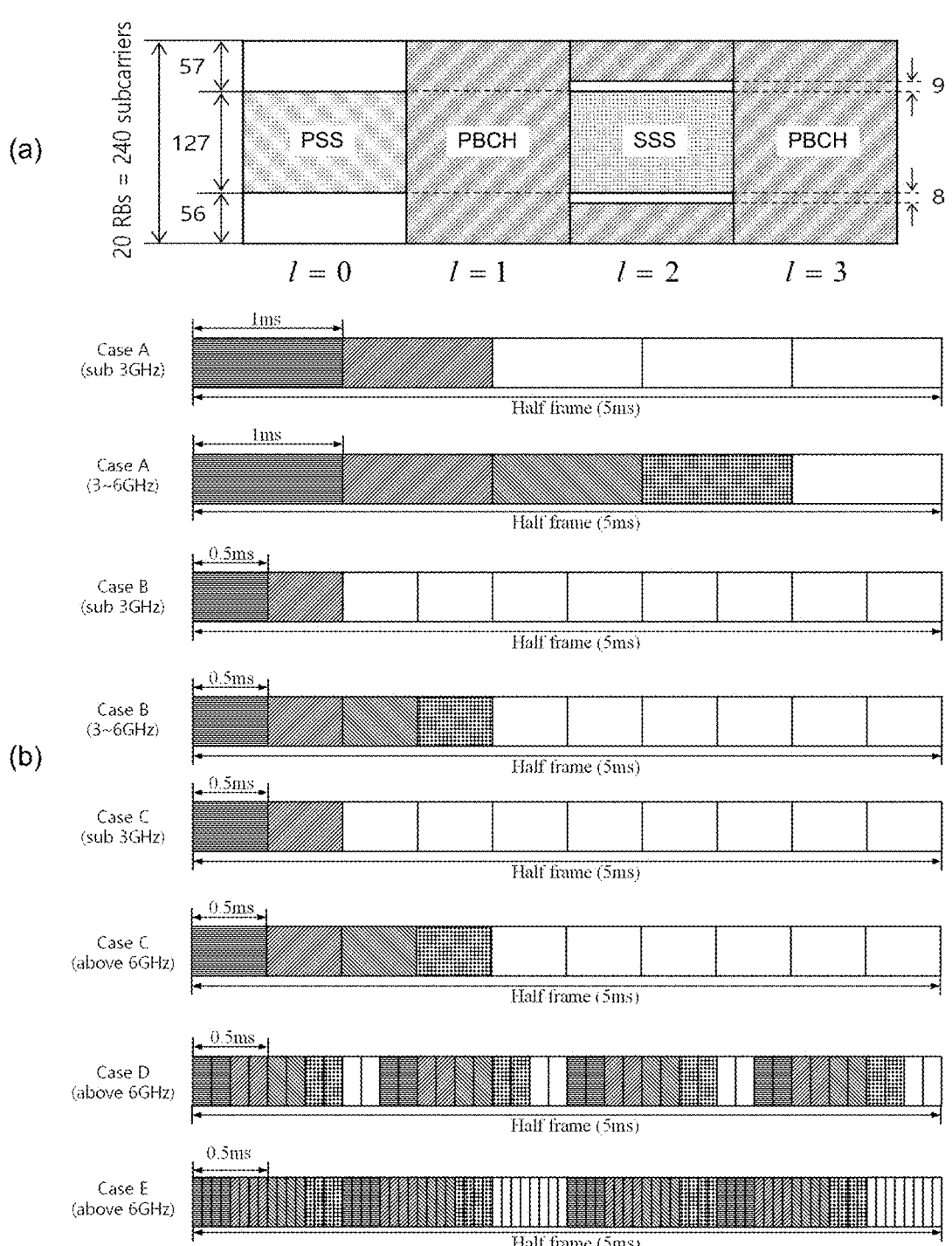
FIG. 4 illustrates an SS/PBCH block for initial cell access in a 3GPP NR system.

FIG. 4 illustrates an SS/PBCH block for initial cell access in a 3GPP NR system.

When the power is turned on or wanting to access a new cell, the UE may obtain time and frequency synchronization with the cell and perform an initial cell search procedure. The UE may detect a physical cell identity $N^{cell}_{ID}$ of the cell during a cell search procedure. For this, the UE may receive a synchronization signal, for example, a primary synchronization signal (PSS) and a secondary synchronization signal (SSS), from a base station, and synchronize with the base station. In this case, the UE can obtain information such as a cell identity (ID).

Referring to FIG. 4A, a synchronization signal (SS) will be described in more detail. The synchronization signal can be classified into PSS and SSS. The PSS may be used to obtain time domain synchronization and/or frequency domain synchronization, such as OFDM symbol synchronization and slot synchronization. The SSS can be used to obtain frame synchronization and cell group ID. Referring to FIG. 4A and Table 2, the SS/PBCH block can be configured with consecutive 20 RBs (=240 subcarriers) in the frequency axis, and can be configured with consecutive 4 OFDM symbols in the time axis. In this case, in the SS/PBCH block, the PSS is transmitted in the first OFDM symbol and the SSS is transmitted in the third OFDM symbol through the 56th to 182th subcarriers. Here, the lowest subcarrier index of the SS/PBCH block is numbered from 0. In the first OFDM symbol in which the PSS is transmitted, the base station does not transmit a signal through the remaining subcarriers, i.e., 0th to 55th and 183th to 239th subcarriers. In addition, in the third OFDM symbol in which the SSS is transmitted, the base station does not transmit a signal through 48th to 55th and 183th to 191th subcarriers. The base station transmits a physical broadcast channel (PBCH) through the remaining RE except for the above signal in the SS/PBCH block.

TABLE 2

| Channel or signal | OFDM symbol number l relative to the start of an SS/PBCH block | Subcarrier number k relative to the start of an SS/PBCH block |
|---|---|---|
| PSS | 0 | 56, 57, . . . , 182 |
| SSS | 2 | 56, 57, . . . , 182 |
| Set to 0 | 0 | 0, 1, . . . , 55, 183, 184, . . . , 239 |
| | 2 | 48, 49, . . . , 55, 183, 184, . . . , 191 |
| PBCH | 1, 3 | 0, 1, . . . , 239 |
| | 2 | 0, 1, . . . , 47, 192, 193, . . . , 239 |
| DM-RS for PBCH | 1, 3 | 0 + v, 4 + v, 8 + v, . . . , 236 + v |
| | 2 | 0 + v, 4 + v, 8 + v, . . . , 44 + v 192 + v, 196 + v, . . . , 236 + v |

The SS allows a total of 1008 unique physical layer cell IDs to be grouped into 336 physical-layer cell-identifier groups, each group including three unique identifiers, through a combination of three PSSs and SSSs, specifically, such that each physical layer cell ID is to be only a part of one physical-layer cell-identifier group. Therefore, the physical layer cell ID $N^{cell}_{ID}=3N^{(1)}_{ID}+N^{(2)}_{ID}$ can be uniquely defined by the index $N^{(1)}_{ID}$ ranging from 0 to 335 indicating a physical-layer cell-identifier group and the index $N^{(2)}_{ID}$ ranging from 0 to 2 indicating a physical-layer identifier in the physical-layer cell-identifier group. The UE may detect the PSS and identify one of the three unique physical-layer identifiers. In addition, the UE can detect the SSS and identify one of the 336 physical layer cell IDs associated with the physical-layer identifier. In this case, the sequence $d_{PSS}(n)$ of the PSS is as follows.

$$d_{PSS}(n) = 1 - 2x(m)$$

$$m = \left(n + 43N^{(2)}_{ID}\right) \bmod 127$$

$$0 \le n < 127$$

Here, $x(i+7)=(x(i+4)+x(i)) \bmod 2$ and is given as $$[x(6)\ x(5)\ x(4)\ x(3)\ x(2)\ x(1)\ x(0)]=[1\ 1\ 1\ 0\ 1\ 1\ 0]$$

Further, the sequence $d_{SSS}(n)$ of the SSS is as follows.

$$d_{SSS}(n) = [1 - 2x_0((n + m_0) \bmod 127)][1 - 2x_1((n + m_1) \bmod 127)]$$

$$m_0 = 15 \left\lfloor \frac{N^{(1)}_{ID}}{112} \right\rfloor + 5N^{(2)}_{ID}$$

$$m_1 = N^{(1)}_{ID} \bmod 112$$

$$0 \le n < 127$$

$$x_0(i+7)=(x_0(i+4)+x_0(i)) \bmod 2$$

Here, $x_1(i+7)=(x_1(i+1)+x_1(i)) \bmod 2$ and is given as $$[x_0(6)\ x_0(5)\ x_0(4)\ x_0(3)\ x_0(2)\ x_0(1)\ x_0(0)]=[0\ 0\ 0\ 0\ 0\ 0\ 1]$$

$$[x_1(6)\ x_1(5)\ x_1(4)\ x_1(3)\ x_1(2)\ x_1(1)\ x_1(0)]=[0\ 0\ 0\ 0\ 0\ 0\ 1]$$

A radio frame with a 10 ms length may be divided into two half frames with a 5 ms length. Referring to FIG. 4B, a description will be made of a slot in which SS/PBCH blocks are transmitted in each half frame. A slot in which the SS/PBCH block is transmitted may be any one of the cases A, B, C, D, and E. In the case A, the subcarrier spacing is 15 kHz and the starting time point of the SS/PBCH block is the ({2, 8}+14*n)-th symbol. In this case, n=0 or 1 at a carrier frequency of 3 GHz or less. In addition, it may be n=0, 1, 2, 3 at carrier frequencies above 3 GHz and below 6 GHz. In the case B, the subcarrier spacing is 30 kHz and the starting time point of the SS/PBCH block is {4, 8, 16, 20}+28*n. In this case, n=0 at a carrier frequency of 3 GHz or less. In addition, it may be n=0, 1 at carrier frequencies above 3 GHz and below 6 GHz. In the case C, the subcarrier spacing is 30 kHz and the starting time point of the SS/PBCH block is the ({2, 8}+14*n)-th symbol. In this case, n=0 or 1 at a carrier frequency of 3 GHz or less. In addition, it may be n=0, 1, 2, 3 at carrier frequencies above 3 GHz and below 6 GHz. In the case D, the subcarrier spacing is 120 kHz and the starting time point of the SS/PBCH block is the ({4, 8, 16, 20}+28*n)-th symbol. In this case, at a carrier frequency of 6 GHz or more, n=0, 1, 2, 3, 5, 6, 7, 8, 10, 11, 12, 13, 15, 16, 17, 18. In the case E, the subcarrier spacing is 240 kHz and the starting time point of the SS/PBCH block is the ({8, 12, 16, 20, 32, 36, 40, 44}+56*n)-th symbol. In this case, at a carrier frequency of 6 GHz or more, n=0, 1, 2, 3, 5, 6, 7, 8.

Figure 5:
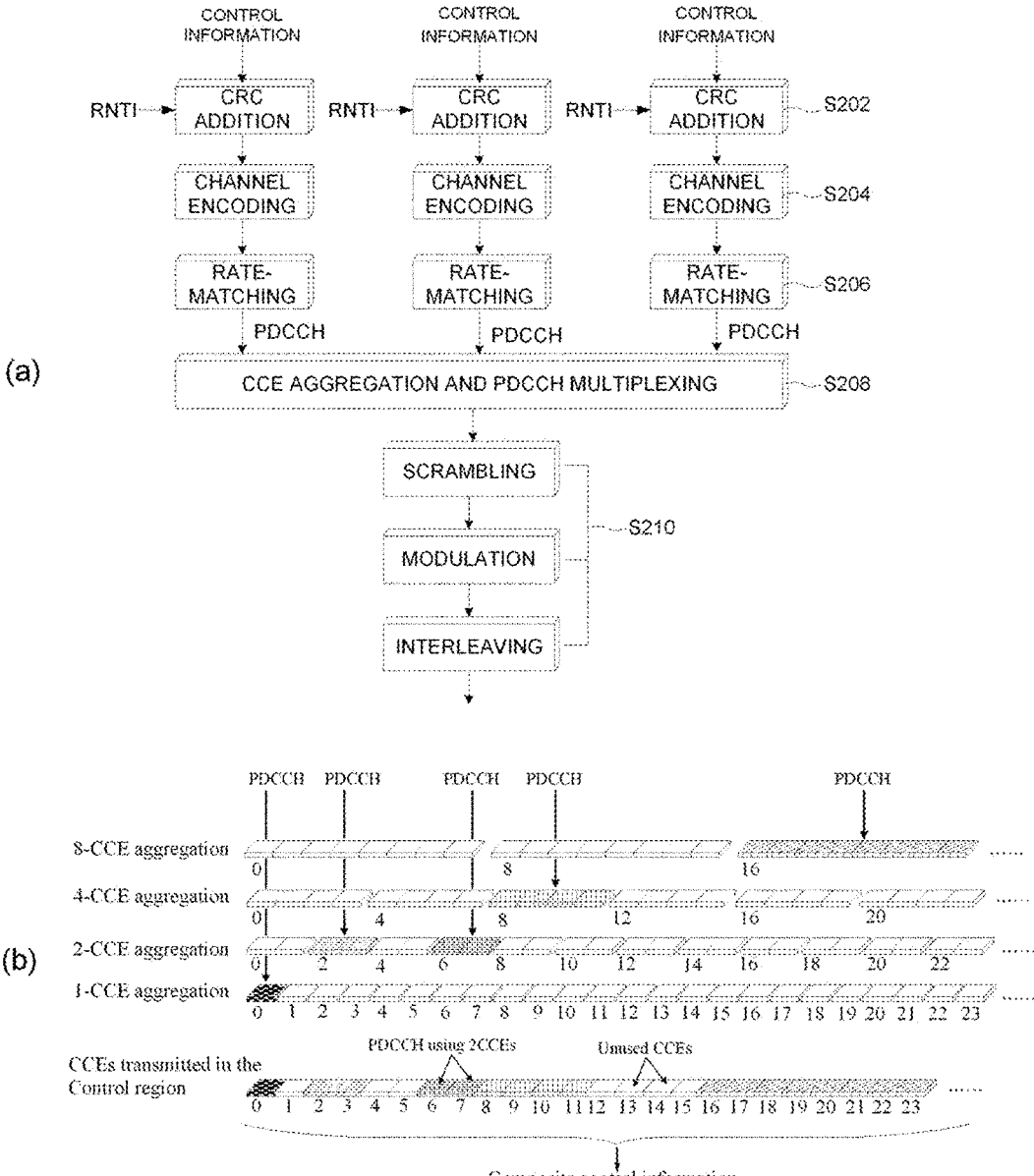
FIG. 5 illustrates a procedure for transmitting control information and a control channel in a 3GPP NR system.

FIG. 5 illustrates a procedure for transmitting control information and a control channel in a 3GPP NR system. Referring to FIG. 5A, the base station may add a cyclic redundancy check (CRC) masked (e.g., an XOR operation) with a radio network temporary identifier (RNTI) to control information (e.g., downlink control information (DCI)) (S202). The base station may scramble the CRC with an RNTI value determined according to the purpose/target of each control information. The common RNTI used by one or more UEs can include at least one of a system information RNTI (SI-RNTI), a paging RNTI (P-RNTI), a random access RNTI (RA-RNTI), and a transmit power control RNTI (TPC-RNTI). In addition, the UE-specific RNTI may include at least one of a cell temporary RNTI (C-RNTI), and the CS-RNTI. Thereafter, the base station may perform rate-matching (S206) according to the amount of resource(s) used for PDCCH transmission after performing channel encoding (e.g., polar coding) (S204). Thereafter, the base station may multiplex the DCI(s) based on the control channel element (CCE) based PDCCH structure (S208). In addition, the base station may apply an additional process (S210) such as scrambling, modulation (e.g., QPSK), interleaving, and the like to the multiplexed DCI(s), and then map the DCI(s) to the resource to be transmitted. The CCE is a basic resource unit for the PDCCH, and one CCE may include a plurality (e.g., six) of resource element groups (REGs). One REG may be configured with a plurality (e.g., 12) of REs. The number of CCEs used for one PDCCH may be defined as an aggregation level. In the 3GPP NR system, an aggregation level of 1, 2, 4, 8, or 16 may be used. FIG. 5B is a diagram related to a CCE aggregation level and the multiplexing of a PDCCH and illustrates the type of a CCE aggregation level used for one PDCCH and CCE(s) transmitted in the control area according thereto.

Figure 6:
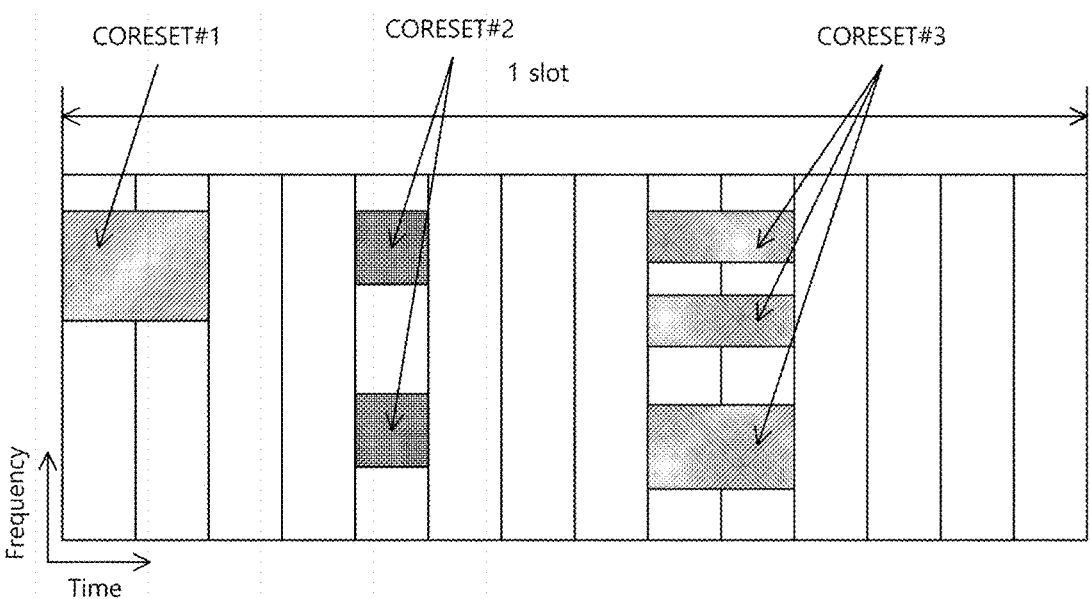
FIG. 6 illustrates a control resource set (CORESET) in which a physical downlink control channel (PUCCH) may be transmitted in a 3GPP NR system.

FIG. 6 illustrates a control resource set (CORESET) in which a physical downlink control channel (PUCCH) may be transmitted in a 3GPP NR system.

The CORESET is a time-frequency resource in which PDCCH, that is, a control signal for the UE, is transmitted. In addition, a search space to be described later may be mapped to one CORESET. Therefore, the UE may monitor the time-frequency domain designated as CORESET instead of monitoring all frequency bands for PDCCH reception, and decode the PDCCH mapped to CORESET. The base station may configure one or more CORESETs for each cell to the UE. The CORESET may be configured with up to three consecutive symbols on the time axis. In addition, the CORESET may be configured in units of six consecutive PRBs on the frequency axis. In the embodiment of FIG. 5, CORESET#1 is configured with consecutive PRBs, and CORESET#2 and CORESET#3 are configured with discontinuous PRBs. The CORESET can be located in any symbol in the slot. For example, in the embodiment of FIG. 5, CORESET#1 starts at the first symbol of the slot, CORESET#2 starts at the fifth symbol of the slot, and CORESET#9 starts at the ninth symbol of the slot.

Figure 7:
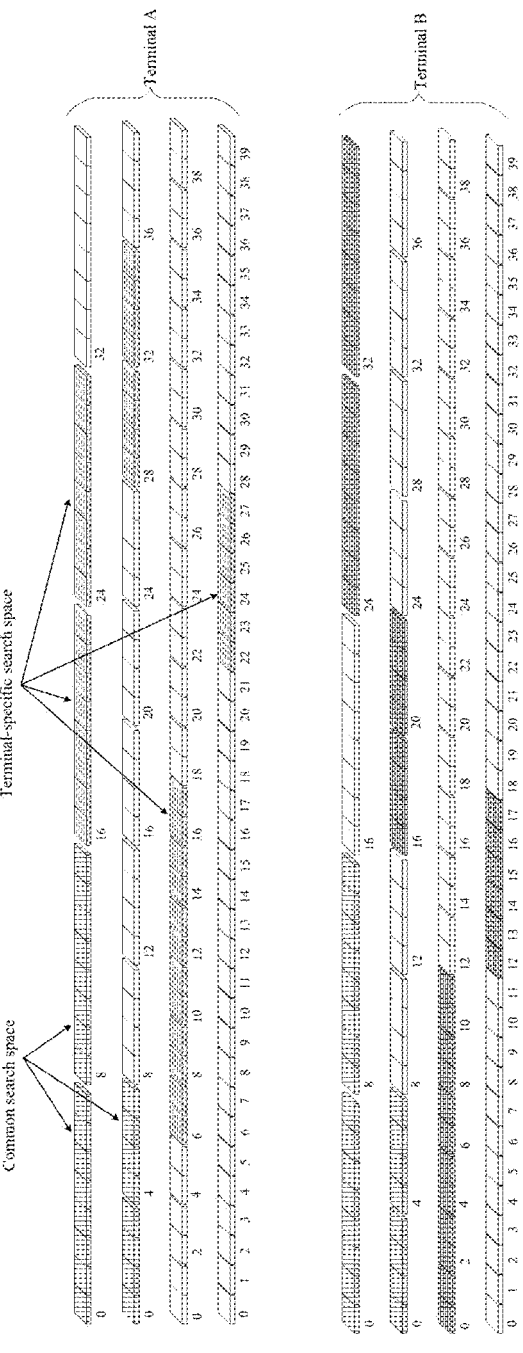
FIG. 7 illustrates a method for configuring a PDCCH search space in a 3GPP NR system.

FIG. 7 illustrates a method for setting a PUCCH search space in a 3GPP NR system.

In order to transmit the PDCCH to the UE, each CORESET may have at least one search space. In the embodiment of the present disclosure, the search space is a set of all time-frequency resources (hereinafter, PDCCH candidates) through which the PDCCH of the UE is capable of being transmitted. The search space may include a common search space that the UE of the 3GPP NR is required to commonly search and a UE-specific or a UE-specific search space that a specific UE is required to search. In the common search space, UE may monitor the PDCCH that is set so that all UEs in the cell belonging to the same base station commonly search. In addition, the UE-specific search space may be set for each UE so that UEs monitor the PDCCH allocated to each UE at different search space position according to the UE. In the case of the UE-specific search space, the search space between the UEs may be partially overlapped and allocated due to the limited control area in which the PDCCH may be allocated. Monitoring the PDCCH includes blind decoding for PDCCH candidates in the search space. When the blind decoding is successful, it may be expressed that the PDCCH is (successfully) detected/received and when the blind decoding fails, it may be expressed that the PDCCH is not detected/not received, or is not successfully detected/received.

For convenience of explanation, a PDCCH scrambled with a group common (GC) RNTI previously known to one or more UEs so as to transmit DL control information to the one or more UEs is referred to as a group common (GC) PDCCH or a common PDCCH. In addition, a PDCCH scrambled with a specific-terminal RNTI that a specific UE already knows so as to transmit UL scheduling information or DL scheduling information to the specific UE is referred to as a specific-UE PDCCH. The common PDCCH may be included in a common search space, and the UE-specific PDCCH may be included in a common search space or a UE-specific PDCCH.

The base station may signal each UE or UE group through a PDCCH about information (i.e., DL Grant) related to resource allocation of a paging channel (PCH) and a downlink-shared channel (DL-SCH) that are a transmission channel or information (i.e., UL grant) related to resource allocation of a uplink-shared channel (UL-SCH) and a hybrid automatic repeat request (HARQ). The base station may transmit the PCH transport block and the DL-SCH transport block through the PDSCH. The base station may transmit data excluding specific control information or specific service data through the PDSCH. In addition, the UE may receive data excluding specific control information or specific service data through the PDSCH.

The base station may include, in the PDCCH, information on to which UE (one or a plurality of UEs) PDSCH data is transmitted and how the PDSCH data is to be received and decoded by the corresponding UE, and transmit the PDCCH. For example, it is assumed that the DCI transmitted on a specific PDCCH is CRC masked with an RNTI of "A", and the DCI indicates that PDSCH is allocated to a radio resource (e.g., frequency location) of "B" and indicates transmission format information (e.g., transport block size, modulation scheme, coding information, etc.) of "C". The UE monitors the PDCCH using the RNTI information that the UE has. In this case, if there is a UE which performs blind decoding the PDCCH using the "A" RNTI, the UE receives the PDCCH, and receives the PDSCH indicated by "B" and "C" through the received PDCCH information.

Table 3 shows an embodiment of a physical uplink control channel (PUCCH) used in a wireless communication system.

TABLE 3

| PUCCH format | Length in OFDM symbols | Number of bits |
|---|---|---|
| 0 | 1-2 | ≤2 |
| 1 | 4-14 | ≤2 |
| 2 | 1-2 | >2 |
| 3 | 4-14 | >2 |
| 4 | 4-14 | >2 |

The PUCCH may be used to transmit the following UL control information (UCI).

Scheduling Request (SR): Information used for requesting a UL UL-SCH resource.

HARQ-ACK: A Response to PDCCH (indicating DL SPS release) and/or a response to DL transport block (TB) on PDSCH. HARQ-ACK indicates whether information successfully transmitted on the PDCCH or PDSCH is received. The HARQ-ACK response includes positive ACK (simply ACK), negative ACK (hereinafter NACK), Discontinuous Transmission (DTX), or NACK/DTX. Here, the term HARQ-ACK is used mixed with HARQ-ACK/NACK and ACK/NACK. In general, ACK may be represented by bit value 1 and NACK may be represented by bit value 0.

Channel State Information (CSI): Feedback information on the DL channel. The UE generates it based on the CSI-Reference Signal (RS) transmitted by the base station. Multiple Input Multiple Output (MIMO)-related feedback information includes a Rank Indicator (RI) and a Precoding Matrix Indicator (PMI). CSI can be divided into CSI part 1 and CSI part 2 according to the information indicated by CSI.

In the 3GPP NR system, five PUCCH formats may be used to support various service scenarios, various channel environments, and frame structures.

PUCCH format 0 is a format capable of delivering 1-bit or 2-bit HARQ-ACK information or SR. PUCCH format 0 can be transmitted through one or two OFDM symbols on the time axis and one PRB on the frequency axis. When PUCCH format 0 is transmitted in two OFDM symbols, the same sequence on the two symbols may be transmitted through different RBs. In this case, the sequence may be a sequence cyclic shifted (CS) from a base sequence used in PUCCH format 0. Through this, the UE may obtain a frequency diversity gain. In more detail, the UE may determine a cyclic shift (CS) value $m_{cs}$ according to $M_{bit}$ bit UCI ($M_{bit}$=1 or 2). In addition, the base sequence having the length of 12 may be transmitted by mapping a cyclic shifted sequence based on a predetermined CS value $m_{cs}$ to one OFDM symbol and 12 REs of one RB. When the number of cyclic shifts available to the UE is 12 and $M_{bit}$=1, 1 bit UCI 0 and 1 may be mapped to two cyclic shifted sequences having a difference of 6 in the cyclic shift value, respectively. In addition, when $M_{bit}$=2, 2 bit UCI 00, 01, 11, and 10 may be mapped to four cyclic shifted sequences having a difference of 3 in cyclic shift values, respectively.

PUCCH format 1 may deliver 1-bit or 2-bit HARQ-ACK information or SR. PUCCH format 1 maybe transmitted through consecutive OFDM symbols on the time axis and one PRB on the frequency axis. Here, the number of OFDM symbols occupied by PUCCH format 1 may be one of 4 to 14. More specifically, UCI, which is $M_{bit}$=1, may be BPSK-modulated. The UE may modulate UCI, which is $M_{bit}$=2, with quadrature phase shift keying (QPSK). A signal is obtained by multiplying a modulated complex valued symbol d(0) by a sequence of length 12. In this case, the sequence may be a base sequence used for PUCCH format 0. The UE spreads the even-numbered OFDM symbols to which PUCCH format 1 is allocated through the time axis orthogonal cover code (OCC) to transmit the obtained signal. PUCCH format 1 determines the maximum number of different UEs multiplexed in the one RB according to the length of the OCC to be used. A demodulation reference signal (DMRS) may be spread with OCC and mapped to the odd-numbered OFDM symbols of PUCCH format 1.

PUCCH format 2 may deliver UCI exceeding 2 bits. PUCCH format 2 may be transmitted through one or two OFDM symbols on the time axis and one or a plurality of RBs on the frequency axis. When PUCCH format 2 is transmitted in two OFDM symbols, the sequences which are transmitted in different RBs through the two OFDM symbols may be same each other. Here, the sequence may be a plurality of modulated complex valued symbols d(0), . . . , d($M_{symbol}$–1). Here, $M_{symbol}$ may be $M_{bit}$/2. Through this, the UE may obtain a frequency diversity gain. More specifically, $M_{bit}$ bit UCI ($M_{bit}$>2) is bit-level scrambled, QPSK modulated, and mapped to RB(s) of one or two OFDM symbol(s). Here, the number of RBs may be one of 1 to 16.

PUCCH format 3 or PUCCH format 4 may deliver UCI exceeding 2 bits. PUCCH format 3 or PUCCH format 4 may be transmitted through consecutive OFDM symbols on the time axis and one PRB on the frequency axis. The number of OFDM symbols occupied by PUCCH format 3 or PUCCH format 4 may be one of 4 to 14. Specifically, the UE modulates $M_{bit}$ bits UCI ($M_{bit}$>2) with π/2-Binary Phase Shift Keying (BPSK) or QPSK to generate a complex valued symbol d(0) to d($M_{symb}$–1). Here, when using π/2-BPSK, $M_{symb}$=$M_{bit}$, and when using QPSK, $M_{symb}$=$M_{bit}$/2. The UE may not apply block-unit spreading to the PUCCH format 3. However, the UE may apply block-unit spreading to one RB (i.e., 12 subcarriers) using PreDFT-OCC of a length of 12 such that PUCCH format 4 may have two or four multiplexing capacities. The UE performs transmit precoding (or DFT-precoding) on the spread signal and maps it to each RE to transmit the spread signal.

In this case, the number of RBs occupied by PUCCH format 2, PUCCH format 3, or PUCCH format 4 may be determined according to the length and maximum code rate of the UCI transmitted by the UE. When the UE uses PUCCH format 2, the UE may transmit HARQ-ACK information and CSI information together through the PUCCH. When the number of RBs that the UE may transmit is greater than the maximum number of RBs that PUCCH format 2, or PUCCH format 3, or PUCCH format 4 may use, the UE may transmit only the remaining UCI information without transmitting some UCI information according to the priority of the UCI information.

PUCCH format 1, PUCCH format 3, or PUCCH format 4 may be configured through the RRC signal to indicate frequency hopping in a slot. When frequency hopping is configured, the index of the RB to be frequency hopped may be configured with an RRC signal. When PUCCH format 1, PUCCH format 3, or PUCCH format 4 is transmitted through N OFDM symbols on the time axis, the first hop may have floor (N/2) OFDM symbols and the second hop may have ceiling(N/2) OFDM symbols.

PUCCH format 1, PUCCH format 3, or PUCCH format 4 may be configured to be repeatedly transmitted in a plurality of slots. In this case, the number K of slots in which the PUCCH is repeatedly transmitted may be configured by the RRC signal. The repeatedly transmitted PUCCHs must start at an OFDM symbol of the constant position in each slot, and have the constant length. When one OFDM symbol among OFDM symbols of a slot in which a UE should transmit a PUCCH is indicated as a DL symbol by an RRC signal, the UE may not transmit the PUCCH in a corresponding slot and delay the transmission of the PUCCH to the next slot to transmit the PUCCH.

Meanwhile, in the 3GPP NR system, a UE may perform transmission/reception using a bandwidth equal to or less than the bandwidth of a carrier (or cell). For this, the UE may receive the Bandwidth part (BWP) configured with a continuous bandwidth of some of the carrier's bandwidth. A UE operating according to TDD or operating in an unpaired spectrum can receive up to four DL/UL BWP pairs in one carrier (or cell). In addition, the UE may activate one DL/UL BWP pair. A UE operating according to FDD or operating in paired spectrum can receive up to four DL BWPs on a DL carrier (or cell) and up to four UL BWPs on a UL carrier (or cell). The UE may activate one DL BWP and one UL BWP for each carrier (or cell). The UE may not perform reception or transmission in a time-frequency resource other than the activated BWP. The activated BWP may be referred to as an active BWP.

The base station may indicate the activated BWP among the BWPs configured by the UE through downlink control information (DCI). The BWP indicated through the DCI is activated and the other configured BWP(s) are deactivated. In a carrier (or cell) operating in TDD, the base station may include, in the DCI for scheduling PDSCH or PUSCH, a bandwidth part indicator (BPI) indicating the BWP to be activated to change the DL/UL BWP pair of the UE. The UE may receive the DCI for scheduling the PDSCH or PUSCH and may identify the DL/UL BWP pair activated based on the BPI. For a DL carrier (or cell) operating in an FDD, the base station may include a BPI indicating the BWP to be activated in the DCI for scheduling PDSCH so as to change the DL BWP of the UE. For a UL carrier (or cell) operating in an FDD, the base station may include a BPI indicating the BWP to be activated in the DCI for scheduling PUSCH so as to change the UL BWP of the UE.

Figure 8:
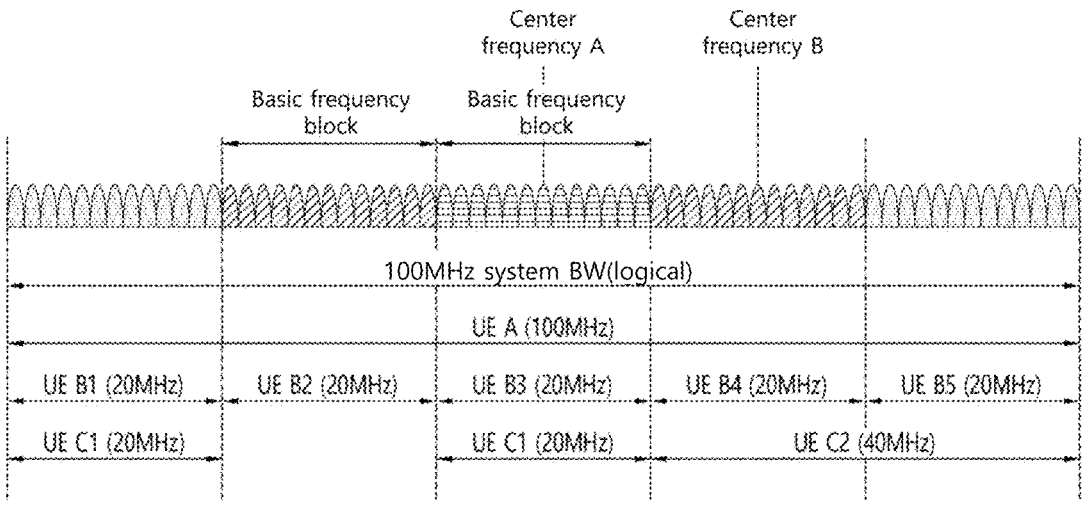
FIG. 8 is a conceptual diagram illustrating carrier aggregation.

FIG. 8 is a conceptual diagram illustrating carrier aggregation.

The carrier aggregation is a method in which the UE uses a plurality of frequency blocks or cells (in the logical sense) configured with UL resources (or component carriers) and/ or DL resources (or component carriers) as one large logical frequency band in order for a wireless communication system to use a wider frequency band. One component carrier may also be referred to as a term called a Primary cell (PCell) or a Secondary cell (SCell), or a Primary SCell (PScell). However, hereinafter, for convenience of description, the term "component carrier" is used.

Referring to FIG. 8, as an example of a 3GPP NR system, the entire system band may include up to 16 component carriers, and each component carrier may have a bandwidth of up to 400 MHz. The component carrier may include one or more physically consecutive subcarriers. Although it is shown in FIG. 8 that each of the component carriers has the same bandwidth, this is merely an example, and each component carrier may have a different bandwidth. Also, although each component carrier is shown as being adjacent to each other in the frequency axis, the drawings are shown in a logical concept, and each component carrier may be physically adjacent to one another, or may be spaced apart.

Different center frequencies may be used for each component carrier. Also, one common center frequency may be used in physically adjacent component carriers. Assuming that all the component carriers are physically adjacent in the embodiment of FIG. 8, center frequency A may be used in all the component carriers. Further, assuming that the respective component carriers are not physically adjacent to each other, center frequency A and the center frequency B can be used in each of the component carriers.

When the total system band is extended by carrier aggregation, the frequency band used for communication with each UE can be defined in units of a component carrier. UE A may use 100 MHz, which is the total system band, and performs communication using all five component carriers. UEs $B_1 \sim B_5$ can use only a 20 MHz bandwidth and perform communication using one component carrier. UEs $C_1$ and $C_2$ may use a 40 MHz bandwidth and perform communication using two component carriers, respectively. The two component carriers may be logically/physically adjacent or non-adjacent. UE $C_1$ represents the case of using two non-adjacent component carriers, and UE $C_2$ represents the case of using two adjacent component carriers.

Figure 9:
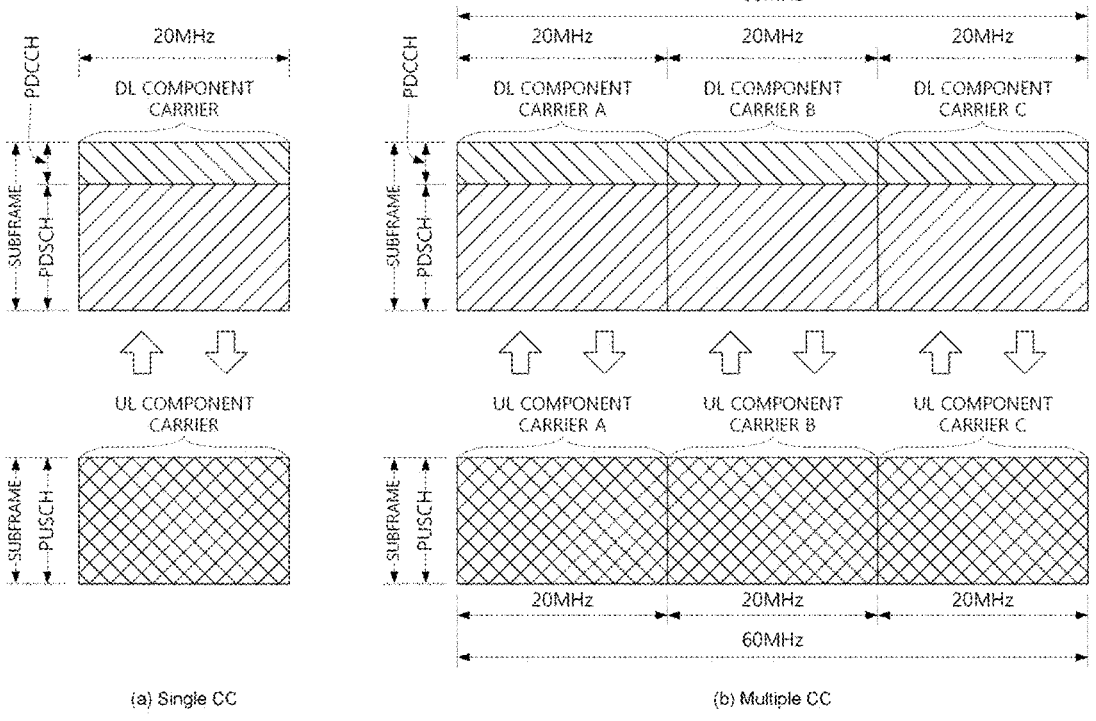
FIG. 9 is a diagram for explaining signal carrier communication and multiple carrier communication.

FIG. 9 is a drawing for explaining signal carrier communication and multiple carrier communication. Particularly, FIG. 9A shows a single carrier subframe structure and FIG. 9B shows a multi-carrier subframe structure.

Referring to FIG. 9A, in an FDD mode, a general wireless communication system may perform data transmission or reception through one DL band and one UL band corresponding thereto. In another specific embodiment, in a TDD mode, the wireless communication system may divide a radio frame into a UL time unit and a DL time unit in a time domain, and perform data transmission or reception through a UL/DL time unit. Referring to FIG. 9B, three 20 MHz component carriers (CCs) can be aggregated into each of UL and DL, so that a bandwidth of 60 MHz can be supported. Each CC may be adjacent or non-adjacent to one another in the frequency domain. FIG. 9B shows a case where the bandwidth of the UL CC and the bandwidth of the DL CC are the same and symmetric, but the bandwidth of each CC can be determined independently. In addition, asymmetric carrier aggregation with different number of UL CCs and DL CCs is possible. A DL/UL CC allocated/configured to a specific UE through RRC may be called as a serving DL/UL CC of the specific UE.

The base station may perform communication with the UE by activating some or all of the serving CCs of the UE or deactivating some CCs. The base station can change the CC to be activated/deactivated, and change the number of CCs to be activated/deactivated. If the base station allocates a CC available for the UE as to be cell-specific or UE-specific, at least one of the allocated CCs can be deactivated, unless the CC allocation for the UE is completely reconfigured or the UE is handed over. One CC that is not deactivated by the UE is called as a Primary CC (PCC) or a primary cell (PCell), and a CC that the base station can freely activate/deactivate is called as a Secondary CC (SCC) or a secondary cell (SCell).

Meanwhile, 3GPP NR uses the concept of a cell to manage radio resources. A cell is defined as a combination of DL resources and UL resources, that is, a combination of DL CC and UL CC. A cell may be configured with DL resources alone, or a combination of DL resources and UL resources. When the carrier aggregation is supported, the linkage between the carrier frequency of the DL resource (or DL CC) and the carrier frequency of the UL resource (or UL CC) may be indicated by system information. The carrier frequency refers to the center frequency of each cell or CC. A cell corresponding to the PCC is referred to as a PCell, and a cell corresponding to the SCC is referred to as an SCell. The carrier corresponding to the PCell in the DL is the DL PCC, and the carrier corresponding to the PCell in the UL is the UL PCC. Similarly, the carrier corresponding to the SCell in the DL is the DL SCC and the carrier corresponding to the SCell in the UL is the UL SCC. According to UE capability, the serving cell(s) may be configured with one PCell and zero or more SCells. In the case of UEs that are in the RRC_CONNECTED state but not configured for carrier aggregation or that do not support carrier aggregation, there is only one serving cell configured only with PCell.

As mentioned above, the term "cell" used in carrier aggregation is distinguished from the term "cell" which refers to a certain geographical area in which a communication service is provided by one base station or one antenna group. That is, one component carrier may also be referred to as a scheduling cell, a scheduled cell, a primary cell (PCell), a secondary cell (SCell), or a primary SCell (PS-cell). However, in order to distinguish between a cell referring to a certain geographical area and a cell of carrier aggregation, in the present disclosure, a cell of a carrier aggregation is referred to as a CC, and a cell of a geographical area is referred to as a cell.

Figure 10:
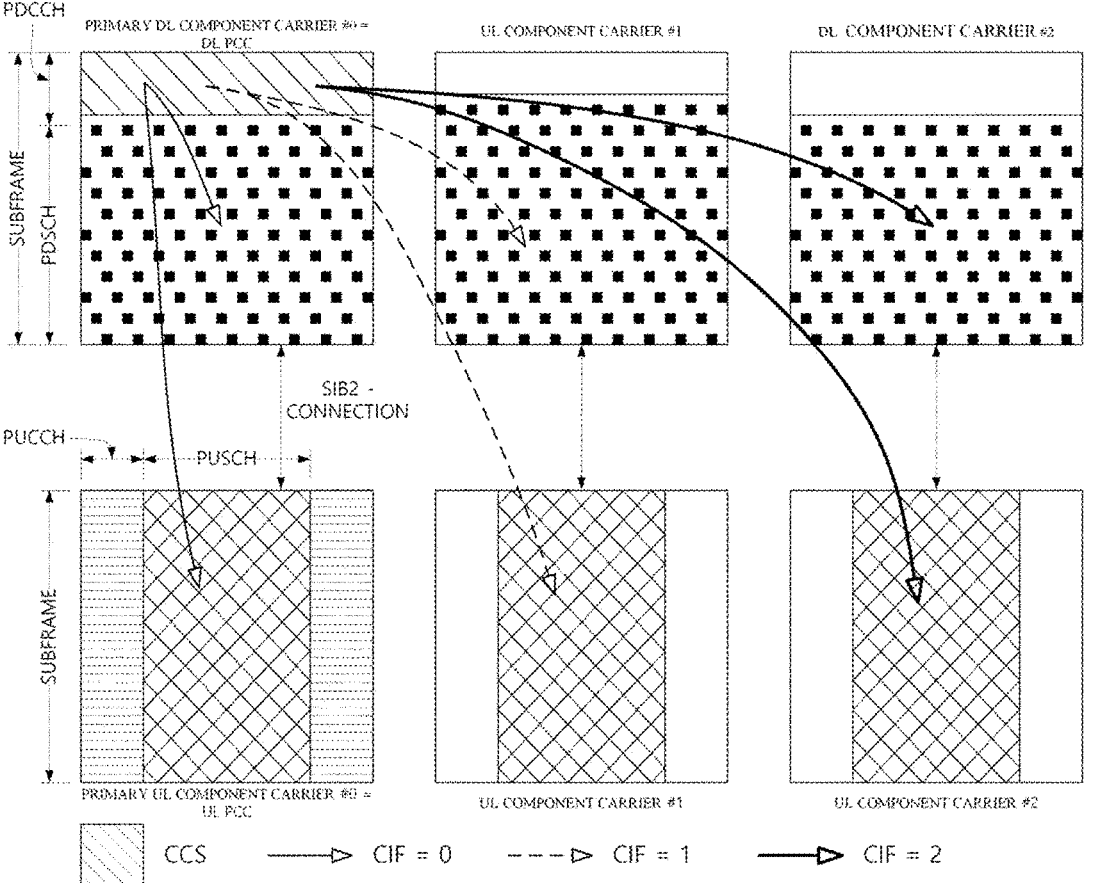
FIG. 10 is a diagram showing an example in which a cross carrier scheduling technique is applied.

FIG. 10 is a diagram showing an example in which a cross carrier scheduling technique is applied. When cross carrier scheduling is set, the control channel transmitted through the first CC may schedule a data channel transmitted through the first CC or the second CC using a carrier indicator field (CIF). The CIF is included in the DCI. In other words, a scheduling cell is set, and the DL grant/UL grant transmitted in the PDCCH area of the scheduling cell schedules the PDSCH/PUSCH of the scheduled cell. That is, a search area for the plurality of component carriers exists in the PDCCH area of the scheduling cell. A PCell may be basically a scheduling cell, and a specific SCell may be designated as a scheduling cell by an upper layer.

In the embodiment of FIG. 10, it is assumed that three DL CCs are merged. Here, it is assumed that DL component carrier #0 is DL PCC (or PCell), and DL component carrier #1 and DL component carrier #2 are DL SCCs (or SCell). In addition, it is assumed that the DL PCC is set to the PDCCH monitoring CC. When cross-carrier scheduling is not configured by UE-specific (or UE-group-specific or cell-specific) higher layer signaling, a CIF is disabled, and each DL CC can transmit only a PDCCH for scheduling its PDSCH without the CIF according to an NR PDCCH rule (non-cross-carrier scheduling, self-carrier scheduling). Meanwhile, if cross-carrier scheduling is configured by UE-specific (or UE-group-specific or cell-specific) higher layer signaling, a CIF is enabled, and a specific CC (e.g., DL PCC) may transmit not only the PDCCH for scheduling the PDSCH of the DL CC A using the CIF but also the PDCCH for scheduling the PDSCH of another CC (cross-carrier scheduling). On the other hand, a PDCCH is not transmitted in another DL CC. Accordingly, the UE monitors the PDCCH not including the CIF to receive a self-carrier scheduled PDSCH depending on whether the cross-carrier scheduling is configured for the UE, or monitors the PDCCH including the CIF to receive the cross-carrier scheduled PDSCH.

On the other hand, FIGS. 9 and 10 illustrate the subframe structure of the 3GPP LTE-A system, and the same or similar configuration may be applied to the 3GPP NR system. However, in the 3GPP NR system, the subframes of FIGS. 9 and 10 may be replaced with slots.

As described above, since the existing communication in the unlicensed band mostly operates based on LBT, a channel access in the NR-U system also performs LBT for coexistence with existing devices. Specifically, the channel access method on the unlicensed band in the NR may be classified into the following four categories according to the presence/absence of LBT/application method.

Category 1: No LBT

The Tx entity does not perform the LBT procedure for transmission.

Category 2: LBT without Random Backoff

The Tx entity senses whether a channel is idle during a first interval without random backoff to perform a transmission. That is, the Tx entity may perform a transmission through the channel immediately after the channel is sensed to be idle during the first interval. The first interval is an interval of a predetermined length immediately before the Tx entity performs the transmission. According to an embodiment, the first interval may be an interval of 25 μs length, but the present invention is not limited thereto.

Category 3: LBT Performing Random Backoff Using CW of Fixed Size

The Tx entity obtains a random value within the CW of the fixed size, sets it to an initial value of a backoff counter (or backoff timer) N, and performs backoff by using the set backoff counter N. That is, in the backoff procedure, the Tx entity decreases the backoff counter by 1 whenever the channel is sensed to be idle for a predetermined slot period. Here, the predetermined slot period may be 9 μs, but the present invention is not limited thereto. The backoff counter N is decreased by 1 from the initial value, and when the value of the backoff counter N reaches 0, the Tx entity may perform the transmission. Meanwhile, in order to perform backoff, the Tx entity first senses whether the channel is idle during a second interval (that is, a defer duration $T_d$). According to an embodiment of the present invention, the Tx entity may sense (determine) whether the channel is idle during the second interval, according to whether the channel is idle for at least some period (e.g., one slot period) within the second interval. The second interval may be set based on the channel access priority class of the Tx entity, and consists of a period of 16 μs and m consecutive slot periods. Here, m is a value set according to the channel access priority class. The Tx entity performs channel sensing to decrease the backoff counter when the channel is sensed to be idle during the second interval. On the other hand, when the channel is sensed to be busy during the backoff procedure, the backoff procedure is stopped. After stopping the backoff procedure, the Tx entity may resume backoff when the channel is sensed to be idle for an additional second interval. In this way, the Tx entity may perform the transmission when the channel is idle during the slot period of the backoff counter N, in addition to the second interval. In this case, the initial value of the backoff counter N is obtained within the CW of the fixed size.

Category 4: LBT Performing Random Backoff by Using CW of Variable Size

The Tx entity obtains a random value within the CW of a variable size, sets the random value to an initial value of a backoff counter (or backoff timer) N, and performs backoff by using the set backoff counter N. More specifically, the Tx entity may adjust the size of the CW based on HARQ-ACK information for the previous transmission, and the initial value of the backoff counter N is obtained within the CW of the adjusted size. A specific process of performing backoff by the Tx entity is as described in Category 3. The Tx entity may perform the transmission when the channel is idle during the slot period of the backoff counter N, in addition to the second interval. In this case, the initial value of the backoff counter N is obtained within the CW of the variable size.

In the above Category 1 to Category 4, the Tx entity may be a base station or a UE. According to an embodiment of the present invention, a first type channel access may refer to a Category 4 channel access, and a second type channel access may refer to a Category 2 channel access.

Hereinafter an LBT procedure used when a wireless communication device according to an embodiment of the present invention performs a channel access in an unlicensed band will be described. In particular, a channel access in which the wireless communication device performs a transmission according to a result of channel sensing within a time interval of a predetermined duration may be configured in the wireless communication device. In this case, a method for operating a wireless communication device when the wireless communication device fails to access a channel will be described. The specified duration which has been mentioned earlier may be 16 μs.

For convenience of description, the wireless communication device, which is a wireless endpoint that initiates channel occupation, is referred to as an initiating node. In addition, a wireless communication device, which is a wireless endpoint communicating with the initiating node, is referred to as a responding node. The initiating node may be a base station and the responding node may be a UE. In addition, the initiating node may be a UE and the responding node may be a base station. When the initiating node intends to transmit data, the initiating node may perform a channel access according to a channel access priority class determined according to the type of data. In this case, a parameter used for a channel access may be determined according to the type of data. The parameters used for the channel access may include any one of the minimum value of the CW, the maximum value of the CW, the maximum occupancy time (MCOT), which is the maximum duration capable of occupying a channel in one channel occupancy, and the number $(m_p)$ of sensing slots. Specifically, the initiating node may perform the above-described Category 4 LBT according to the channel access priority class determined according to the type of data.

Table 4 below shows an example of values of parameters used for a channel access according to the channel access priority class. Specifically, Table 4 shows values of parameters used for a channel access for each channel access priority class for the downlink transmission in the LTE LAA system.

When the downlink channel transmitted by the wireless communication device includes data traffic, the defer duration may be configured according to the channel access priority class of traffic included in the downlink channel. In addition, the defer duration may include an initial duration $T_f$ or one or more $(m_p)$ slot durations $T_{sl}$. In this case, the slot duration $T_{sl}$ may be 9 μs. The initial duration includes one idle slot duration $T_{sl}$. In addition, the number $(m_p)$ of slot durations included in the defer duration may be configured according to the above-described channel access priority class. Specifically, the number $(m_p)$ of slot durations included in the defer duration may be configured as shown in Table 4.

TABLE 4

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

In addition, the wireless communication device may configure the range of the CW values according to the channel access priority class. Specifically, the wireless communication device may set the value of the CW to satisfy $CW_{min,p} <= CW <= CW_{max,p}$. In this case, the minimum value $CW_{min,p}$ and the maximum value $CW_{max,p}$ of the CW may be determined according to the channel access priority class. Specifically, the minimum value $CW_{min,p}$ and the maximum value CWmax,p of the CW may be determined as shown in Table 4. The wireless communication device may set a minimum value $CW_{min,p}$ and a maximum value $CW_{max,p}$ of CW in a counter value setting procedure. When the wireless communication device accesses the channel, the wireless communication device may adjust the value of the CW. In addition, in the wireless communication device of the unlicensed band, the MCOT $T_{mcot,p}$ may be determined according to the channel access priority of data included in the transmission as described above. Specifically, the MCOT may be determined as shown in Table 4. Accordingly, the wireless communication device may not be allowed to perform continuous transmissions for a time exceeding the MCOT in the unlicensed band. This is because the unlicensed band is a frequency band used by various wireless communication devices according to certain rules. In Table 4, when the value of the channel access priority class is p=3 or p=4, the unlicensed band is used for a long term according to the regulations, and there is no wireless communication device using other technology, the wireless communication device may be configured with $T_{mcot,p}=10$ ms. Otherwise, the wireless communication device may be configured with $T_{mcot,p}=8$ ms.

Hereinafter, in the specification, a channel access method performed by a base station before performing transmission of a downlink channel in a wireless communication system on an unlicensed band is described. More specifically, a channel access priority class (CAPC) to be used when the base station performs channel access for transmission of a downlink control channel (e.g., PDCCH) is described.

During the channel access performed before the base station transmits the downlink control channel, different channel access priority classes need to be applied according to various types of information transmitted through the downlink control channel, a transmission time point of the downlink control channel, and the like. In general, when a PDSCH including unicast data scheduled through a PDCCH is transmitted on the same slot of the same carrier as that of the PDCCH, the base station may configure a CAPC according to a traffic type of the unicast data included in the PDSCH. In addition, the base station may perform channel access for transmission of the PDCCH and the PDSCH on the same slot of the same carrier according to the configured CAPC. However, when the base station performs channel access for transmission of a PDCCH other than the PDCCH for scheduling of the PDSCH including the unicast data transmitted on the same slot of the same carrier as that of the PDCCH, there may be ambiguity in a CAPC which is to be selected for channel access. Accordingly, in the present invention, a scheme in which the base station selects a CAPC to perform channel access for PDCCH transmission according to information transmitted through the PDCCH, scheduling time points of the PDCCH and the PDSCH, whether the PDCCH and the PDSCH scheduled by the PDCCH are transmitted in the same carrier or different carriers, and the like, is described.

Information transmitted through a PDCCH when a base station transmits a downlink control channel (e.g., PDCCH) may include various types of information below. In this case, the base station may transmit a PDCCH including each of the various types of the information, or the base station may transmit several PDCCHs including the respective types of information in one control resource set (CORESET). The CORESET may mean a resource area in which the PDCCH is transmitted.

Various types of information transmitted through the PDCCH are described. That is, various DCI formats which can be transmitted through the PDCCH are described.
1. DCI Format for Transmission of Downlink Shared Channel (PDSCH) Transmitted through PDCCH
   1-A. DCI format for scheduling PDSCH including unicast data, PDSCH being transmitted on one or more slots including same slot as transmission time point of PDCCH of same carrier as that of PDCCH
   1-B. DCI format for scheduling PDSCH including unicast data, PDSCH being transmitted on a slot different from transmission time point of PDCCH of same carrier as that of PDCCH 1-C. DCI format for scheduling PDSCH including unit cast data, PDSCH being transmitted on slot of carrier different from PDCCH 1-D. DCI format indicating semi-persistent scheduling (SPS) PDSCH reception 1-E. DCI format indicating releasing of SPS PDSCH reception 2. DCI Format for Transmission of Uplink Shared Channel (PUSCH) Transmitted through PDCCH 2-A. DCI format for scheduling PUSCH including unicast data, PUSCH being transmitted by terminal on one or more slots including same slot as transmission time point of PDCCH in same carrier as that of PDCCH 2-B. DCI format for scheduling PUSCH including unicast data, PUSCH being transmitted by terminal on slot different from transmission time point of PDCCH in same carrier as that of PDCCH 2-C. DCI format for scheduling PUSCH including unicast data, PUSCH being transmitted by terminal on slot of carrier different from PDCCH 2-D. DCI format indicating activation of configured grant PUSCH 2-E. DCI format indicating releasing of configured grant PUSCH 2-F. DCI format indicating downlink feedback information for configured grant PUSCH 3. DCI Format for Other Purposes of Transmission through PDCCH (Purposes Other than Purpose of Uplink/Downlink Shared Channel (PUSCH/PDSCH) Transmission)

3-A. DCI format indicating search space set group switching to group of UEs, slot format, available RB sets, and channel occupancy time (COT) duration 3-B. DCI format indicating PRBs and OFDM symbols so that terminal can assume that there is no intended transmission 3-C. DCI format indicating, to group of UEs, transmit power control (TPC) command transmission for PUCCH and PUSCH 3-D. DCI format indicating, to one or more UEs, commands for group of TPCs for sounding reference signal (SRS) transmissions When the first to third DCI formats transmitted through a PDCCH are multiplexed with a PDSCH including unicast data, the base station may select a CAPC according to a traffic type of the unicast data included in the PDSCH.

However, when the DCI format, such as 1-B to 1-E, 2-A to 2-F, and 3-A to 3-D, is not multiplexed with a PDSCH including unicast data, the PDSCH being transmitted on a slot different from a slot on which a PDCCH is transmitted, and when the DCI format is independently transmitted on one slot through the PDCCH, or when the DCI format for scheduling a PUSCH including unicast data is transmitted on one slot through the PDCCH (e.g., in cases of 2-A to 2-F described above), a CAPC to be selected and used for performing channel access by the base station during channel access for PDCCH transmission needs to be defined.

When the DCI format is not multiplexed with a PDSCH including unicast data and transmitted on a slot different from a slot on which a PDCCH is transmitted, the base station may select a CAPC having the highest priority to perform channel access for PDCCH transmission. When the base station performs channel access by using the CAPC having the highest priority, the channel access priority for transmission of a control channel (i.e., PDCCH) can be advanced.

When the DCI format is not multiplexed with a PDSCH including unicast data and transmitted on a slot different from a slot on which a PDCCH is transmitted, the base station may select a CAPC having the lowest priority to perform channel access for PDCCH transmission. When the base station performs channel access by using the CAPC having the lowest priority, the base station may perform the channel access by using a CAPC having the longest maximum channel occupancy time (MCOT), among CAPCs. This is because the longest MCOT is configured for the CAPC having the lowest priority. Accordingly, data channels and a control channel having a CAPC identical to the CAPC having the lowest priority in the MCOT configured by the CAPC having the lowest CAPC, and a CAPC having a higher priority, can be multiplexed and transmitted on slots after channel access.

There may be a method in which the base station selects a CAPC for each of the first to third DCI formats. Specifically, when the DCI formats transmitted through a PDCCH is multiplexed with a PDSCH including unicast data, a CAPC may be selected according to a traffic type of the unicast data included in the PDSCH. For example, when the second DCI format transmitted through a PDCCH schedules a PUSCH including unicast data, the base station may select a CAPC according to a traffic type of the unicast data included in the PUSCH.

In a case of the third DCI format transmitted through a PDCCH according to a specific purpose, the base station may perform channel access by using a CAPC having the highest priority to advance the channel access priority. This is because information for the specific purpose is to be necessarily transmitted through DCI. When the third DCI format is transmitted through a PDCCH according to a specific purpose, the base station may use a CAPC having the lowest priority during channel access. When the base station performs the channel access by using the CAPC having the lowest priority, the base station may perform channel access by using a CAPC having the longest maximum channel occupancy time (MCOT), among CAPCs. This is because the longest MCOT is configured for the CAPC having the lowest priority. Accordingly, data channels and a control channel having a CAPC identical to the CAPC having the lowest priority in the MCOT configured by the CAPC having the lowest CAPC, and a CAPC having a higher priority, can be multiplexed and transmitted on slots after channel access. In other words, the third DCI format may mean a DCI format not including information for scheduling an uplink/downlink channel (e.g., PUSCH or PDSCH).

When each of the first to third DCI formats is transmitted through the PDCCH, the base station may select a CAPC for performing channel access according to each of the DCI format. A specific CAPC selection method is as shown in table 5.

TABLE 5

| Classification | DCI format case | Channel access priority class # |
| --- | --- | --- |
| 1. DCI format for transmission of downlink channel transmitted through PDCCH | 1-A | A CAPC is selected according to a traffic type of unicast data included in a PDSCH. |
| | 1-B | A CAPC is selected according to a traffic type of unicast data included in a PDSCH. |
| | 1-C | A CAPC having the lowest priority is used, or a CAPC is selected |

TABLE 5-continued　　　　　　　　　　TABLE 5-continued

| Classification | DCI format case | Channel access priority class # |
|---|---|---|
| | | according to a traffic type of unicast data included in a PDSCH. |
| | 1-D | In a case of PDCCH transmission for SPS PDSCH reception, when activation is not transmitted through a PDCCH, a resource for the SPS PDSCH reception is not configured, and thus the resource is not wasted, whereby a CAPC having the lowest priority is selected. |
| | 1-E | In a case of PDCCH transmission for releasing of SPS PDSCH reception, when SPS PDSCH releasing is not transmitted through a PDCCH, a resource SPS PDSCH is not released, and thus the resource may be wasted, whereby a CAPC having the highest priority is selected. |
| 2. DCI format for transmission of uplink channel transmitted through PDCCH | 2-A | A CAPC is selected according to a traffic type of unicast data included in a PUSCH. |
| | 2-B | A CAPC is selected according to a traffic type of unicast data included in a PUSCH. |
| | 2-C | A CAPC having the lowest priority is used, or a CAPC is selected according to a traffic type of unicast data included in a PUSCH. |
| | 2-D | In a case of PDCCH transmission for configured PUSCH reception, when activation is not transmitted through a PDCCH, a resource for a configured PUSCH is not activated and the corresponding resource can be used for other purposes, and thus the resource may be wasted, whereby a CAPC having the lowest priority is selected. |
| | 2-E | In a case of PDCCH transmission for configured PUSCH releasing, when the configured PUSCH releasing is not transmitted through a PDCCH, a resource for a configured PUSCH is not released, and thus the resource may be unnecessarily wasted, whereby a CAPC having the highest priority is selected. |
| | 2-F | In a case of PDCCH transmission including downlink feedback |

| Classification | DCI format case | Channel access priority class # |
|---|---|---|
| | | information (DFI) for a configured PUSCH, when configured PUSCH feedback is not transmitted through a PDCCH, use of a resource for the configured PUSCH may be ambiguous and the resource may be unnecessarily wasted, and thus a CAPC having the highest priority is selected. |
| 3. DCI format for other purposes of transmission through PDCCH | 3-A | Information on a slot format for NR-U operation, available RB sets, COT duration, search space set group switching, etc. has a high level of importance for efficiency of downlink channel transmission and resource use, and thus a CAPC having the highest priority is selected. |
| | 3-B | On the unlicensed band, there is low possibility that interrupted transmission occurs, and thus a CAPC having the lowest priority is selected. |
| | 3-C | In consideration of robustness of a system, there is low possibility of having a problem even when a 3-C DCI format is transmitted at low frequency, and thus a CAPC having the lowest priority is selected. |
| | 3-D | In consideration of robustness of a system, there is low possibility of having a problem even when a 3-C DCI format is transmitted at low frequency, and thus a CAPC having the lowest priority is selected. |

Each of the first to third DCI formats may be transferred through one PDCCH, and one or more PDCCHs may be multiplexed in a CORESET to be transmitted from the base station to the terminal. Accordingly, when there are one or more PDCCHs multiplexed in the CORESET, the base station needs to select a CAPC to be used during channel access for transmission of one or more PDCCHs in time and frequency domains including the one or more PDCCHs, for performing channel access.

When there are one or more PDCCHs multiplexed in the CORESET, the base station may perform channel access by using a CAPC having the lowest priority, among CAPCs configured for the respective PDCCHs. When the base station performs channel access by using a CAPC having the lowest priority, the base station may perform channel access by using a CAPC having the longest maximum channel occupancy time (MCOT), among CAPCs. This is because the longest MCOT is configured for the CAPC having the lowest priority. Accordingly, data channels and a control channel having a CAPC identical to the CAPC having the lowest priority in the MCOT configured by the CAPC having the lowest CAPC, and a CAPC having a higher priority, can be multiplexed and transmitted on slots after channel access.

When there are one or more PDCCHs multiplexed in the CORESET, the base station may perform channel access by using a CAPC configured when a specific PDCCH schedules a PDSCH or a PUSCH including unicast data, or the base station may perform channel access by using a CAPC configured when the PDCCH and the PDSCH are multiplexed.

The CAPC having the highest priority and the CAPC having the lowest priority may mean a CAPC having the highest priority (e.g., p=1) and a CAPC having the lowest priority (e.g., p=4), among multiple preconfigured CAPCs (see table 4).

RACH Enhancement for NR-Unlicensed (NR-U)

In NR-U, channel access is performed based on a 20 MHz transmission unit, and whether to perform transmission by a base station and a terminal in the corresponding 20 MHz basic unit is determined according to a result of channel sensing. The terminal needs to perform a random access process for uplink synchronization with the base station. The random access process is required in an indoor environment to which the NR-U is introduced or an outdoor environment not having a large coverage, in addition to a case where the NR-U is configured to perform a standalone operation. In other words, when the terminal and the base station are non-collocated or in a deployment environment using dual connectivity with an NR base station using non-ideal backhaul, uplink synchronization between the terminal and the base station is necessary, and accordingly, the random access process between the terminal and the base station is required.

In consideration of a characteristic of the NR-U performing LBT based on a 20 MHz transmission unit, there may be a case where a wide-bandwidth (wide-BW) including multiple 20 MHz units of 20 MHz or higher is used in the NR-U and only one random access preamble is transmitted in a specific 20 MHz unit. In this case, as a result of channel sensing according to channel access, when the specific 20 MHz channel is in use (busy), the entire wideband cannot be used for transmission even though other 20 MHz channels are in an idle state. That is, spectral efficiency can be reduced. Accordingly, a random access preamble transmission method in a wideband operation is required. First, in the NR-U, a basic unit of channel access is configured as a 20 MHz unit for both a downlink channel and an uplink channel for coexistence with another RAT (e.g., Wi-Fi) using the unlicensed band. In the NR-U, transmission of an uplink/downlink channel in a BWP unit can be performed by configuring one BWP as one 20 MHz unit. When the wideband operation is performed in the NR-U, multiple 20 MHz units may be present, and multiple BWPs may be configured for the terminal. When a random access process is succeeded in at least one BWP, the base station may perform uplink synchronization with the terminal. Accordingly, occasion for PRACH transmission may be configured for each BWP. When channel access is succeeded in at least one of the multiple BWPs and the terminal performs PRACH transmission, the terminal may perform a first stage for performing uplink synchronization with the base station. This is efficient when PRACH transmission is performed in one specific BWP, compared to a case where the entire wideband cannot be used for the transmission. When the terminal has succeeded in performing channel access in all of the multiple BWPs, there may be a case where the terminal needs to perform PRACH transmission in all of the BWPs. In this case, when several terminals succeed in performing channel access for each of the BWPs and perform PRACH transmission through the multiple BWPs, a large number of collisions may occur between terminals in the same PRACH occasion. Due to the collisions, latency required for the base station to perform contention resolution may increase. In addition, when PRACH transmission is performed through multiple BWPs even though the terminal may perform an uplink synchronization procedure through one of the multiple BWPs, a capacity for PRACH in each cell according to PRACH occasion may be reduced. Accordingly, the present invention proposes a method in which when the multiple BWPs are configured to allow the terminal to perform a wideband operation, each terminal is allowed to perform channel access in each of the BWPs, but PRACH transmission is performed on PRACH occasion through only one BWP agreed between the terminal and the base station, instead of performing PRACH transmission through all of the BWPs through which the terminal has succeeded in performing channel access. That is, the terminal may configure priorities of BWPs transmitted between the terminal and the base station after LBT success, and transmit PRACH to the base station according to the configured priorities. In addition, the base station may perform PRACH detection according to the configured priorities, and when the PRACH detection ends in a BWP according to the configured priorities, the base station may not additionally perform an operation for PRACH detection in other BWPs. In this case, the configured priorities may be determined on the basis of a serving cell index. For example, the priorities may be configured according to the lowest serving cell index or the highest serving cell index. In addition, the configured priorities may be determined on the basis of a BWP index. For example, the priorities may be determined according to the lowest BWP index or the highest BWP index.

Hereinafter, a RACH procedure between a terminal and a base station is described.

Generally, in the NR-U, LBT is performed first for uplink/downlink channel transmission, and as a result of the LBT, when a channel is in an idle state, uplink/downlink channel transmission is performed. However, in a case of a random access procedure in which RRC connection and uplink synchronization are performed, at least four stages of procedure are required between the terminal and the base station. Specifically, an uplink LBT procedure for PRACH transmitted by the terminal, an LBT procedure for a random access response (RAR) transmitted by the base station, and uplink LBT procedure for a PUSCH (i.e., message-3) transmitted to the base station by the terminal in response to the RAR are required. In addition, an LBT procedure for message-4 transmitted by the base station for contention resolution is required. All of the four stages of procedure are important, but when the PRACH transmitted by the terminal has failed to be transmitted due to LBT, the remaining three stages may be meaningless. Accordingly, as a method of increasing opportunity for PRACH transmission, a PRACH opportunity window allowing the PRACH transmission may be configured. Specifically, in the PRACH opportunity window, even though the terminal has failed in the LBT in PRACH occasion configured by the base station, the terminal may continuously perform LBT procedures, instead of stopping the PRACH transmission. That is, this is a method of configuring multiple opportunities for transmitting PRACH transmission to the terminal within the PRACH opportunity window. The PRACH opportunity window may be configured through an RRC configuration from the base station. Before the RRC connection, remaining system information (RMSI) may also indicate information on the PRACH opportunity window. When the terminal has failed to receive the information on the PRACH opportunity window, the terminal may configure a specific fixed value on the basis of PRACH configuration information configured in the RMSI by the base station, and use the configured value for the PRACH opportunity window.

Figure 11:
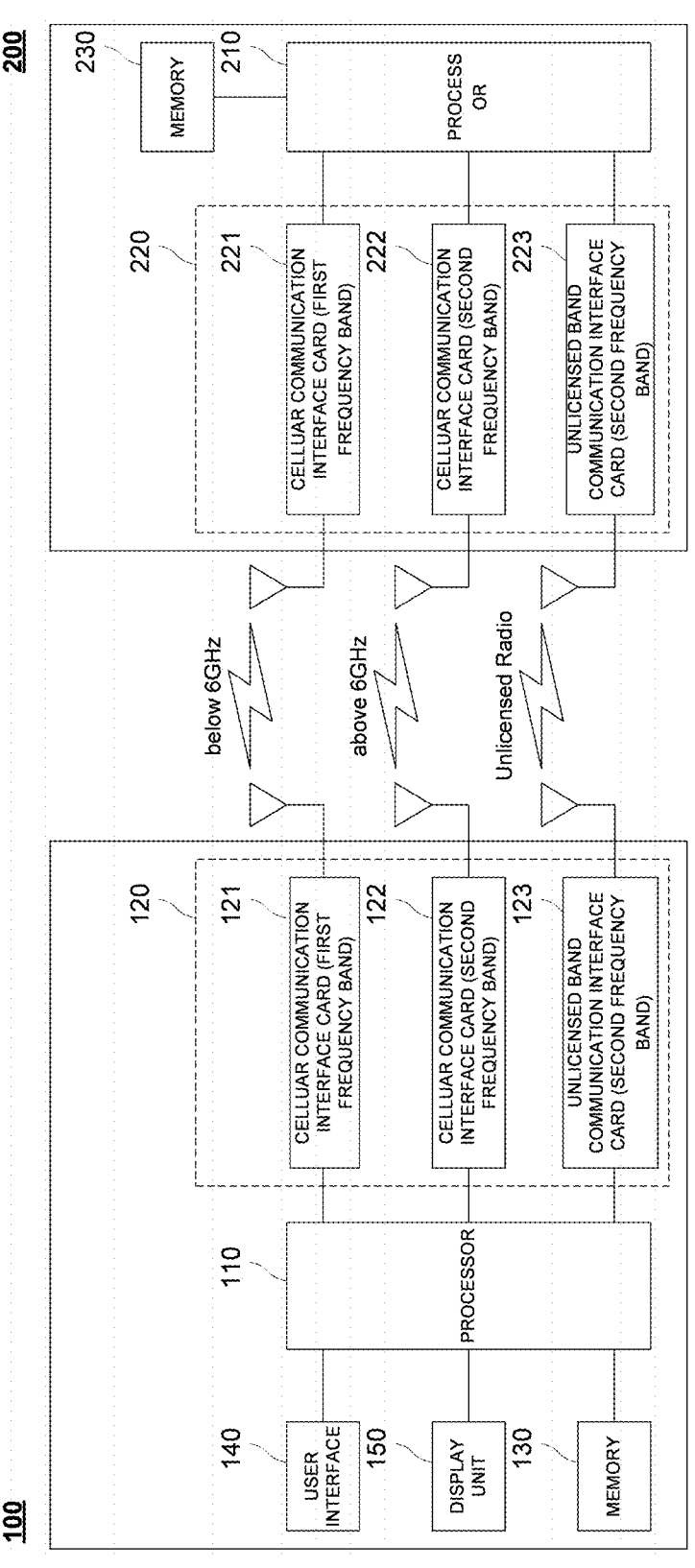
FIG. 11 is a block diagram illustrating configuration of each of a terminal and a base station according to an embodiment of the present invention.

FIG. 11 is a block diagram showing the configurations of a UE and a base station according to an embodiment of the present invention.

In an embodiment of the present invention, the UE may be implemented with various types of wireless communication devices or computing devices that are guaranteed to be portable and mobile. The UE may be referred to as a User Equipment (UE), a Station (STA), a Mobile Subscriber (MS), or the like. In addition, in an embodiment of the present invention, the base station controls and manages a cell (e.g., a macro cell, a femto cell, a pico cell, etc.) corresponding to a service area, and performs functions of a signal transmission, a channel designation, a channel monitoring, a self diagnosis, a relay, or the like. The base station may be referred to as next Generation NodeB (gNB) or Access Point (AP).

As shown in the drawing, a UE 100 according to an embodiment of the present disclosure may include a processor 110, a communication module 120, a memory 130, a user interface 140, and a display unit 150.

First, the processor 110 may execute various instructions or programs and process data within the UE 100. In addition, the processor 110 may control the entire operation including each unit of the UE 100, and may control the transmission/reception of data between the units. Here, the processor 110 may be configured to perform an operation according to the embodiments described in the present invention. For example, the processor 110 may receive slot configuration information, determine a slot configuration based on the slot configuration information, and perform communication according to the determined slot configuration.

Next, the communication module 120 may be an integrated module that performs wireless communication using a wireless communication network and a wireless LAN access using a wireless LAN. For this, the communication module 120 may include a plurality of network interface cards (NICs) such as cellular communication interface cards 121 and 122 and an unlicensed band communication interface card 123 in an internal or external form. In the drawing, the communication module 120 is shown as an integral integration module, but unlike the drawing, each network interface card can be independently arranged according to a circuit configuration or usage.

The cellular communication interface card 121 may transmit or receive a radio signal with at least one of the base station 200, an external device, and a server by using a mobile communication network and provide a cellular communication service in a first frequency band based on the instructions from the processor 110. According to an embodiment, the cellular communication interface card 121 may include at least one NIC module using a frequency band of less than 6 GHz. At least one NIC module of the cellular communication interface card 121 may independently perform cellular communication with at least one of the base station 200, an external device, and a server in accordance with cellular communication standards or protocols in the frequency bands below 6 GHz supported by the corresponding NIC module.

The cellular communication interface card 122 may transmit or receive a radio signal with at least one of the base station 200, an external device, and a server by using a mobile communication network and provide a cellular communication service in a second frequency band based on the instructions from the processor 110. According to an embodiment, the cellular communication interface card 122 may include at least one NIC module using a frequency band of more than 6 GHz. At least one NIC module of the cellular communication interface card 122 may independently perform cellular communication with at least one of the base station 200, an external device, and a server in accordance with cellular communication standards or protocols in the frequency bands of 6 GHz or more supported by the corresponding NIC module.

The unlicensed band communication interface card 123 transmits or receives a radio signal with at least one of the base station 200, an external device, and a server by using a third frequency band which is an unlicensed band, and provides an unlicensed band communication service based on the instructions from the processor 110. The unlicensed band communication interface card 123 may include at least one NIC module using an unlicensed band. For example, the unlicensed band may be a band of 2.4 GHz, 5 GHz, 6 GHz, 7 GHz or above 52.6 GHz. At least one NIC module of the unlicensed band communication interface card 123 may independently or dependently perform wireless communication with at least one of the base station 200, an external device, and a server according to the unlicensed band communication standard or protocol of the frequency band supported by the corresponding NIC module.

The memory 130 stores a control program used in the UE 100 and various kinds of data therefor. Such a control program may include a prescribed program required for performing wireless communication with at least one among the base station 200, an external device, and a server.

Next, the user interface 140 includes various kinds of input/output means provided in the UE 100. In other words, the user interface 140 may receive a user input using various input means, and the processor 110 may control the UE 100 based on the received user input. In addition, the user interface 140 may perform an output based on instructions from the processor 110 using various kinds of output means.

Next, the display unit 150 outputs various images on a display screen. The display unit 150 may output various display objects such as content executed by the processor 110 or a user interface based on control instructions from the processor 110.

In addition, the base station 200 according to an embodiment of the present invention may include a processor 210, a communication module 220, and a memory 230.

First, the processor 210 may execute various instructions or programs, and process internal data of the base station 200. In addition, the processor 210 may control the entire operations of units in the base station 200, and control data transmission and reception between the units. Here, the processor 210 may be configured to perform operations according to embodiments described in the present invention. For example, the processor 210 may signal slot configuration and perform communication according to the signaled slot configuration.

Next, the communication module 220 may be an integrated module that performs wireless communication using a wireless communication network and a wireless LAN access using a wireless LAN. For this, the communication module 220 may include a plurality of network interface cards such as cellular communication interface cards 221 and 222 and an unlicensed band communication interface card 223 in an internal or external form. In the drawing, the communication module 220 is shown as an integral integration module, but unlike the drawing, each network interface card can be independently arranged according to a circuit configuration or usage.

The cellular communication interface card 221 may transmit or receive a radio signal with at least one of the base station 100, an external device, and a server by using a mobile communication network and provide a cellular communication service in the first frequency band based on the instructions from the processor 210. According to an embodiment, the cellular communication interface card 221 may include at least one NIC module using a frequency band of less than 6 GHz. The at least one NIC module of the cellular communication interface card 221 may independently perform cellular communication with at least one of the base station 100, an external device, and a server in accordance with the cellular communication standards or protocols in the frequency bands less than 6 GHz supported by the corresponding NIC module.

The cellular communication interface card 222 may transmit or receive a radio signal with at least one of the base station 100, an external device, and a server by using a mobile communication network and provide a cellular communication service in the second frequency band based on the instructions from the processor 210. According to an embodiment, the cellular communication interface card 222 may include at least one NIC module using a frequency band of 6 GHz or more. The at least one NIC module of the cellular communication interface card 222 may independently perform cellular communication with at least one of the base station 100, an external device, and a server in accordance with the cellular communication standards or protocols in the frequency bands 6 GHz or more supported by the corresponding NIC module.

The unlicensed band communication interface card 223 transmits or receives a radio signal with at least one of the base station 100, an external device, and a server by using the third frequency band which is an unlicensed band, and provides an unlicensed band communication service based on the instructions from the processor 210. The unlicensed band communication interface card 223 may include at least one NIC module using an unlicensed band. For example, the unlicensed band may be a band of 2.4 GHz, 5 GHz, 6 GHz, 7 GHz or above 52.6 GHz. At least one NIC module of the unlicensed band communication interface card 223 may independently or dependently perform wireless communication with at least one of the base station 100, an external device, and a server according to the unlicensed band communication standards or protocols of the frequency band supported by the corresponding NIC module.

FIG. 11 is a block diagram illustrating the UE 100 and the base station 200 according to an embodiment of the present invention, and blocks separately shown are logically divided elements of a device. Accordingly, the aforementioned elements of the device may be mounted in a single chip or a plurality of chips according to the design of the device. In addition, a part of the configuration of the UE 100, for example, a user interface 140, a display unit 150 and the like may be selectively provided in the UE 100. In addition, the user interface 140, the display unit 150 and the like may be additionally provided in the base station 200, if necessary.

Figure 12:
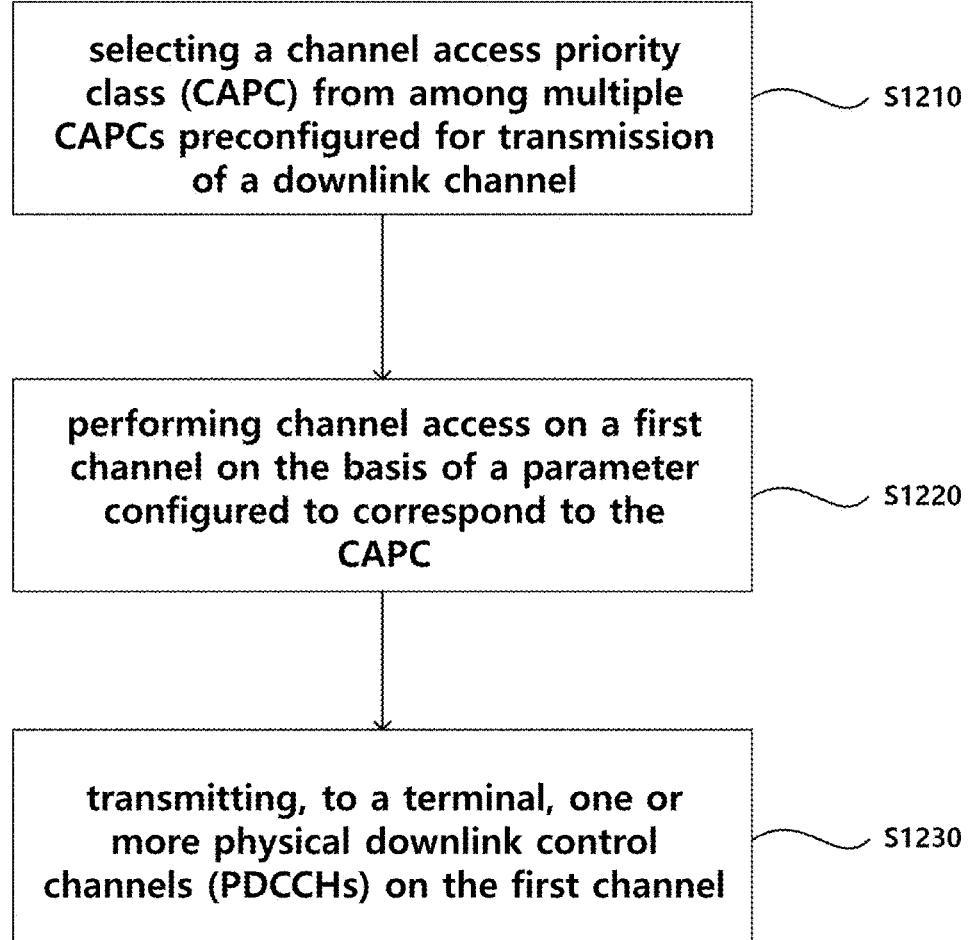
FIG. 12 is a flowchart illustrating a method for transmitting a downlink channel by a base station according to an embodiment of the present invention.

FIG. 12 is a flowchart illustrating a method of transmitting a downlink channel by a base station according to an embodiment of the present invention.

Referring to FIG. 12, the base station selects one of multiple channel access priority classes (CAPCs) preconfigured for transmission of a downlink channel (S1210).

The base station performs channel access on a first channel on the basis of a parameter configured to correspond to the CAPC (S1220).

The base station performs one or more physical downlink control channels (PDCCHs) on the first channel (S1230).

The CAPC may be selected on the basis of information included in the one or more PDCCHs.

For the information included in the one or more PDCCHs, information for scheduling a physical downlink shared channel (PDSCH) transmitted on the same slot as a slot on which the one or more PDCCHs are transmitted may be excluded. In addition, for the information included in the one or more PDCCHs, information for scheduling a physical uplink shared channel (PUSCH) may be excluded.

The information included in the one or more PDCCHs may include at least one of: i) information on a slot format, an available resource block (RB) set, a channel occupancy time (COT), and search space set group switching; ii) information on an OFDM symbol and a physical resource block (PRB) causing the terminal to assume that there is no intended transmission; iii) information on a transmit power control (TPC) command for an uplink channel; and iv) information on a TPC command for sounding reference signal (SRS).

The information included in the one or more PDCCHs may include information for scheduling a PDSCH transmitted on a slot different from a slot on which the one or more PDCCHs are transmitted.

The information included in the one or more PDCCHs may include information for scheduling a PUSCH.

The CAPC may be a CAPC having the highest priority, among the preconfigured multiple CAPCs.

The CAPC may be a CAPC having the lowest priority, among the preconfigured multiple CAPCs.

When the one or more PDCCHs include information for scheduling a PUSCH, the PUSCH may include unicast data. In this case, the CAPC may be selected on the basis of a traffic type of the unicast data.

The one or more PDCCHs may be transmitted on a control resource set (CORESET), and when multiple PDCCHs are transmitted on the CORESET, the CAPC may be a CAPC having the lowest priority, among the CAPCs configured for each of the multiple PDCCHs.

The base station for transmitting a downlink channel to the terminal may be configured to include a communication module and a processor for controlling the communication module. In which case, operations executed by the processor may be operations described with reference to FIG. 12.

The terminal may receive a downlink channel transmitted from the base station. In this case, a method of receiving the downlink channel transmitted from the base station is as follows.

The terminal performs monitoring for reception of one or more physical downlink control channels (PDCCHs) in a control resource set (CORESET).

The terminal may receive the one or more PDCCHs in the CORESET from the base station.

In this case, the one or more PDCCHs may be transmitted on a first channel on which the base station has performed channel access.

The channel access may be performed on the basis of a parameter configured to correspond to a CAPC selected from among preconfigured multiple channel access priority classes (CAPCs).

The CAPC may be selected on the basis of information included in the one or more PDCCHs.

Although the method and system of the present invention have been described in connection with specific embodiments, some or all of components or operations thereof may be implemented using a computing system having a general-purpose hardware architecture.

The description of the present invention described above is only exemplary, and it will be understood by those skilled in the art to which the present invention pertains that various modifications and changes can be made without changing the technical spirit or essential features of the present invention. Therefore, it should be construed that the embodiments described above are illustrative and not restrictive in all respects. For example, each component described as a single type may be implemented in a distributed manner, and similarly, components described as being distributed may also be implemented in a combined form.

The scope of the present invention is indicated by the attached claims rather than the detailed description, and it should be construed that all changes or modifications derived from the meaning and scope of the claims and their equivalents are included in the scope of the present invention.

The invention claimed is:

1. A method for use by a wireless communication device of a wireless communication system, the method comprising:

performing a channel access procedure to transmit a downlink channel based on a channel access priority class (CAPC); and performing a data transmission via the downlink channel, wherein when the data transmission includes a unicast data, the CAPC corresponds to a CAPC applicable to the unicast data, wherein when the data transmission includes a non-unicast data that is not multiplexed with the unicast data, the CAPC corresponds to a CAPC having a highest priority among preconfigured multiple CAPCs.

2. The method of claim 1, wherein when the data transmission includes the unicast data, the downlink channel is associated with a shared channel.

3. The method of claim 1, wherein when the data transmission includes the non-unicast data, the downlink channel is associated with a control channel.

4. The method of claim 1, wherein when the data transmission includes the non-unicast data, the data transmission does not include information for scheduling a shared channel.

5. A wireless communication device configured to operate in a wireless communication system, the wireless communication device comprising:

a communication module; and a processor configured to control the communication module, wherein the processor is configured to:

perform a channel access procedure to transmit a downlink channel based on a channel access priority class (CAPC), perform a data transmission via the downlink channel, wherein when the data transmission includes a unicast data, the CAPC corresponds to a CAPC applicable to the unicast data, wherein when the data transmission includes a non-unicast data that is not multiplexed with the unicast data, the CAPC corresponds to a CAPC having a highest priority among preconfigured multiple CAPCs.

6. The wireless communication device of claim 5, wherein when the data transmission includes the unicast data, the downlink channel is associated with a shared channel.

7. The wireless communication device of claim 5, when the data transmission includes the non-unicast data, wherein the downlink channel is associated with a control channel.

8. The wireless communication device of claim 5, wherein when the data transmission includes the non-unicast data, the data transmission does not include information for scheduling a shared channel.

* * * * *